United States Patent
Yamasaki et al.

(10) Patent No.: US 8,597,686 B2
(45) Date of Patent: Dec. 3, 2013

(54) POROUS CELLULOSE AGGREGATE AND FORMED PRODUCT COMPOSITION COMPRISING THE SAME

(75) Inventors: Naoaki Yamasaki, Nobeoka (JP); Kazuhiro Obae, Nobeoka (JP); Ichiro Ibuki, Nobeoka (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 1978 days.

(21) Appl. No.: 10/587,827

(22) PCT Filed: Jan. 27, 2005

(86) PCT No.: PCT/JP2005/001131
§ 371 (c)(1),
(2), (4) Date: Jul. 28, 2006

(87) PCT Pub. No.: WO2005/073286
PCT Pub. Date: Aug. 11, 2005

(65) Prior Publication Data
US 2007/0190017 A1    Aug. 16, 2007

(30) Foreign Application Priority Data
Jan. 30, 2004    (JP) .................. 2004-024875

(51) Int. Cl.
*A61K 9/14*    (2006.01)
*A61K 9/20*    (2006.01)

(52) U.S. Cl.
USPC ......................................... 424/499; 424/464

(58) Field of Classification Search
None
See application file for complete search history.

(56) References Cited

U.S. PATENT DOCUMENTS

| | | | | |
|---|---|---|---|---|
| 5,607,695 A | * | 3/1997 | Ek et al. | 424/468 |
| 2004/0053887 A1 | * | 3/2004 | Obae et al. | 514/57 |

FOREIGN PATENT DOCUMENTS

| JP | 40-26274 | 11/1915 |
|---|---|---|
| JP | 53-44617 | 4/1978 |
| JP | 53-22138 | 7/1978 |
| JP | 53-127553 | 11/1978 |
| JP | 54/52718 | 4/1979 |
| JP | 56/7713 | 1/1981 |
| JP | 60-25919 | 2/1985 |
| JP | 61-207341 | 9/1986 |
| JP | 63-90501 | 4/1988 |
| JP | 63-267731 | 11/1988 |
| JP | 1-272643 | 10/1989 |
| JP | 2-84401 | 3/1990 |
| JP | 3-264537 | 11/1991 |

(Continued)

OTHER PUBLICATIONS

T. Kennedy, S. Hampshire and Y. Yaginuma, "A Study of the Compaction Mechanism of Granulated Materials", Journal of the European Ceramic Society, 1997, 17, 133-139.*

(Continued)

*Primary Examiner* — Tracy Vivlemore
*Assistant Examiner* — Monica Shin
(74) *Attorney, Agent, or Firm* — Staas & Halsey LLP

(57) ABSTRACT

A porous cellulose aggregate which has a secondary aggregation structure formed by the aggregation of primary cellulose particles, has a pore volume within a particle of 0.265 cm$^3$/g to 2.625 cm$^3$/g, contains I type crystals, has an average particle diameter of more than 30 μm and 250 μm or less, has a specific surface area of 1.3 to 20 cm$^2$/g, has an angle of repose of 25° or more and less than 44°, and has the property that it collapses in water.

13 Claims, 6 Drawing Sheets

(56) References Cited

FOREIGN PATENT DOCUMENTS

| | | |
|---|---|---|
| JP | 4/283520 | 10/1992 |
| JP | 6-316535 | 11/1994 |
| JP | 7-173050 | 7/1995 |
| JP | 7-507692 | 8/1995 |
| JP | 8-193027 | 7/1996 |
| JP | 9-150057 | 6/1997 |
| JP | 11-35487 | 2/1999 |
| JP | 11-152233 | 6/1999 |
| JP | 11-193229 | 7/1999 |
| JP | 2000-16934 | 1/2000 |
| JP | 2000-247869 | 9/2000 |
| JP | 2001-181195 | 7/2001 |
| JP | 2001-316248 | 11/2001 |
| JP | 2002-534455 | 10/2002 |
| JP | 2003-161 | 1/2003 |
| JP | 2003-55219 | 2/2003 |
| JP | 2003-81876 | 3/2003 |
| WO | 02/002643 | 10/2002 |
| WO | 02/036168 | 10/2002 |

OTHER PUBLICATIONS

European Search Report issued Mar. 16, 2009 in corresponding European Patent Application 05709405.4.

"Cellulose Science", Asakura Syoten (2003), cover page, colophon, pp. 74-77.

D. Klemm et al. *Comprehensive Cellulose Chemistry* vol. 1, Wiley-VCH (1998), cover page, preface, p. 21.

* cited by examiner

POROUS CELLULOSE AGGREGATE AND FORMED PRODUCT COMPOSITION COMPRISING THE SAME

This application is based on and hereby claims priority to PCT Application No. PCT/JP2005/001131 filed on Jan. 27, 2005 and Japanese Application No. 2004-024875 filed on Jan. 30, 2004, the contents of which are hereby incorporated by reference.

TECHNICAL FIELD

The present invention relates to a porous cellulose aggregate which is mainly useful as an excipient in the field of chemical industry, particularly, in pharmaceuticals and foods, and a molded product composition thereof.

BACKGROUND ART

Conventionally, cellulose particles such as crystalline cellulose and powdered cellulose have been widely used as an excipient to prepare molded products containing an active ingredient in the field of pharmaceutical, food and other chemical industries. Good compactability, flowability and disintegration property are required for these cellulose particles.

Patent Document 1 describes porous cellulose particles having crystal form I, pores with a pore size of 0.1 µm or more and a porosity of 20% or more and a fraction of not less than 350 mesh by 90 wt % or more (corresponding to Comparative Example 6 of the present application) obtained by mixing cellulose particles with a third ingredient such as a crystalline material insoluble or poorly soluble in water and soluble in an organic solvent, granulating and drying using them or using an aqueous solution of water-soluble organic solvent, subsequently extracting and removing the third ingredient with an organic solvent. Since the porous cellulose particles disclosed in this document form a film-like dense and strong cellulose wall structure formed of primary cellulose particles compacted so uniformly and continuously such that the borders of the particles are indistinct, they completely different from the porous cellulose aggregate of the present invention in the particle structure. Although the cellulose particles according to Patent Document 1 are excellent in flowability, the dense and continuous cellulose wall has little water permeability and therefore they do not disintegrate in water, which may pose a problem in quickly releasing the active ingredient. In addition, the cellulose particles according to Patent Document 1 are poor in plastic deformation properties when the cellulose is compressed, the compactability thereof is insufficient, and the use of an organic solvent and a third ingredient such as a crystalline material soluble in an organic solvent in the production process not only increases the production cost but also may deactivate the active ingredient, and it is not sufficient to be stably used as an excipient.

Patent Document 2 describes porous fine cellulose particles having crystal form I, a porous structure with a specific surface area of 20 m$^2$/g or more and a pore volume by pores having a diameter not less than 0.01 µm of 0.3 cm$^3$/g or more and an average particle size of at most 100 µm (corresponding to Comparative Example 7 of the present application) obtained by granulating and drying particulate natural cellulose dispersed in an organic solvent by spray-drying method. These fine cellulose particles also have the above-mentioned cellulose wall structure, and are totally different from porous cellulose aggregate of the present invention in the particle structure. Furthermore, although the pore volume of the cellulose particle of Patent Document 2 is large in itself, water is hard to permeate into the particle because the particle structure is different from the porous cellulose aggregate of the present invention, and therefore it has a problem of poor disintegration property. In addition, this porous cellulose aggregate particle uses an organic solvent in the production process, which not only increases production cost but also results in too large specific surface area and may promote mutual action between the active ingredient and water and deactivate the active ingredient and therefore it was not sufficient to be stably used as an excipient.

Patent Document 3 describes a cellulose powder having an average polymerization degree of 150-375, an apparent specific volume of 1.84-8.92 cm$^3$/g and a particle size of 300 µm or less (corresponding to Comparative Example 8 of the present application) as a cellulose powder having a good compactability and disintegration property.

Patent Document 4 describes a microcrystalline cellulose aggregate having an average polymerization degree of 60-375, an apparent specific volume of 1.6-3.1 cm$^3$/g, an apparent tapping specific volume of 1.4 cm$^3$/g or more and a repose angle of 35-42° and containing 2-80 wt % of ingredients of not less than 200 mesh (corresponding to Comparative Example 9 of the present application) as a cellulose powder having a good compactability and disintegration property.

The cellulose powders obtained by Examples described in these Patent Documents have small pore volume within a particle according to pore distribution measurement obtained by mercury porosimetry, and it is completely different from the pore structure which has been intentionally formed as the present invention. On this account, these cellulose powders have a small specific surface area as small as 0.6-1.2 m$^2$/g and low compression compactability. These Patent Documents disclose controlling compactability, flowability and disintegration property of the cellulose particles by adjusting the value of apparent specific volume but there was a problem that when the apparent specific volume was in a relatively small range of 2.0-2.9 cm$^3$/g, compactability was not satisfactory although flowability and disintegration property could be excellent whereas when the apparent specific volume was in a slightly increased range of 3.0-3.2 cm$^3$/g, flowability and disintegration property deteriorated although compactability was excellent.

Patent Document 5 describes β-1,4-glucan powder having an average particle size of 30 µm at most and a specific surface area of 1.3 m$^3$/g (corresponding to Comparative Example 1 of the present application) as a cellulose powder having a good compactability. The β-1,4-glucan powder described in the document does not have secondary aggregate structure and there are contained individual primary particles independently. Although this glucan powder had a good compactability, it had a problem that it was inferior in disintegration property. In addition, it was poor in flowability because the average particle size was small.

Patent Document 6 describes, as a cellulose powder having a good compactability and disintegration property, a cellulose powder having an average polymerization degree of 100-375, acetic acid retention of 280% or more, a value of 0.85-0.90 and b value of 0.05-0.10 in Kawakita equation (P·V$_0$/(V$_0$−V)=1/a·b+P/a), an apparent specific volume of 4.0-6.0 cm$^3$/g and an average particle size of 30-120 µm and containing substantially no particles of 355 µm or more (corresponding to Comparative Example 10 of the present application) obtained by hydrating a cellulose base material. The cellulose powders obtained by Examples in this document have also small pore volume within a particle according to pore distribution measurement obtained by mercury porosimetry, and it is completely different from the pore structure which has been intentionally formed as the present invention. There is a description that cellulose powder of Patent Document 6 is excellent in compression compactability and disintegration property, but when the repose angle of Examples having the most excellent balance as specifically disclosed was measured, it exceeded 55° and flowability was not sufficiently satisfied, and therefore there was a problem that the variation index of tablet weight became large in a formulation containing a large amount of active ingredient which was poor in flowability, and the homogeneity of the content of pharmacological agents was affected. In addition, when the cellulose powder of this document was molded under high pressure, high hardness could be provided but there arose a problem of delayed degradation since it had no intentionally formed pores within a particle and had little water permeability into the inside of the particle.

Patent Document 7 describes a crystalline cellulose characterized in that it has an average polymerization degree of 100-375, contains particles which pass a 75-µm screen but remain on a 38-µm screen in an amount of 70 wt % or more of the total weight and has an average ratio of the longer axis to the minor axis of 2.0 or more (corresponding to Comparative Example 11 of the present application) as a cellulose powder having a good compactability, flowability and disintegration property.

Patent Document 8 describes a cellulose powder having an average polymerization degree of 150-450, an average L/D (longer axis/minor axis ratio) ratio of 2.0-4.5 for particles of 75 µm or less, an average particle size of 20-250 µm, an apparent specific volume of 4.0-7.0 $cm^3/g$, a repose angle of 54° or less and a specific surface area of 0.5-4 $m^2/g$ (corresponding to Comparative Examples 2 and 3 of the present application) as a cellulose powder having a good compactability, disintegration property and flowability.

The cellulose powders described in these documents have also small pore volume within a particle measured by mercury porosimetry as mentioned above, and they are completely different from the pore structure which has been intentionally formed as the present invention. The cellulose powders described in these documents provide molded products with high hardness by making the shape of a particle elongated. However, since they have elongated shape, the apparent specific volume increases, and the more compactability increases, the more flowability decreases. When the repose angle was measured for the cellulose powders of Examples described in these documents having the most excellent flowability, it was 44°, when continuous forming at a high rate in a formulation containing a large amount of active ingredient which was poor in flowability, the variation index of tablet weight became large and the homogeneity of the content of pharmacological agents was affected. Therefore the flowability was not satisfied. Furthermore, when the cellulose powders described in these documents were molded under high pressure, high hardness could be provided but there arose a problem of delayed degradation since they had no intentionally formed pores within a particle and had little water permeability into the inside of the particle.

Although the cellulose powders described in these Patent Documents 5-8 provide a sufficient compactability as far as the apparent specific volume is in a range of 2.3-6.4 $cm^3/g$, they had a problem that flowability and disintegration property deteriorate.

Patent Document 9 describes pharmaceutically inert spherical seed core containing 10-70% of a crystalline cellulose having an average polymerization degree of 60-375 and 10-90% of a water-soluble additive as a cellulose powder having a good flowability. Patent Document 10 describes pharmaceutically inert spherical nucleus containing 50% or more of a crystalline cellulose having a water absorption power of 0.5-1.5 ml/g, a sphericity of 0.7 or more, an apparent tapping specific volume of 0.65 g/ml or more, an abrasion degree of 1% or less and an average polymerization degree of 60-375 (corresponding to Comparative Example 12 of the present application) obtained by kneading a powder containing 50% or more of a crystalline cellulose with distilled water in a mixing and stirring granulating machine while mixing. Patent Document 11 describes a microcrystalline cellulose powder having a nondense density of at least 0.4 $g/cm^3$ (2.5 $cm^3/g$ in terms of apparent specific volume), a spherical shape, an average particle size of 5-35 µm and a smooth surface obtained by mechanically reducing the particle size of hydrolyzed cellulose particles and performing spray drying. Patent Document 12 describes cellulose particles containing 10% or more of a crystalline cellulose having an average polymerization degree of 60-350, an apparent tapping specific volume of 0.60-0.95 g/ml, a sphericity of 0.7 or more, a shape factor of 1.10-1.50 and an average particle size of 10-400 µm (corresponding to Comparative Example 13 of the present application) obtained by hydrolyzing a cellulose base material so that the average polymerization degree may be 60-350 and then mechanically grinding it until the average particle size may be 15 µm and drying a dispersion containing the resulted crystalline cellulose in the form of droplets.

The cellulose particles described in these publications do not take secondary aggregate structures and the cellulose particles obtained by the method described in these patent documents have an apparent specific volume of 2.5 $cm^3/g$ or less, a shape near a sphere and an excellent flowability but they are inferior in compression compactability and cannot be molded products having practically sufficient hardness under a commonly used compression pressure of 10-20 MPa.

As stated above, compactability, flowability and disintegration property are properties incompatible to each other in cellulose particles of the prior art and realization of a cellulose particle having all of these physical properties in a good balance have been desired.

In the meantime, since the cellulose particles described in Patent Documents 3-12 do not have intentionally formed pores within a particle and the volume of the pores within a particle is small, they can hardly carry an active ingredient within a particle and there were problems of liquid exudation at the time of compression shaping and troubles in tableting. On the other hand, the cellulose particles described in Patent Documents 1 and 2 have pores within a particle but due to small pore diameter they had a problem that water is hard to permeate into the dense and continuous cellulose wall and therefore they do not disintegrate in water and may cause problems for rapid release of the active ingredient.

In addition, since these cellulose particles do not have intentionally formed pores within a particle and the volume of the pores within a particle is small and they can hardly carry an active ingredient within a particle, they have shortcomings that they release the active ingredient so slowly that they cannot be practically used in a solid formulation of a poorly water-soluble active ingredient unless they are subjected to a complicated process comprising once granulating with water and/or an organic solvent followed by drying and that in the case of a solid formulation of a sublimating active ingredient, the active ingredient may be recrystallized during storage and deteriorates the commercial value.

An active ingredient in a solid formulation for internal application elutes from a drug into body fluid in digestive organs and the active ingredient is absorbed by digestive organs, enters to systemic circulation blood to show the drug efficacy. Because dissolution of poorly water-soluble active ingredient is low, it may be excreted before the administered active ingredient dissolves entirely and exhibits sufficient efficacy. The ratio of the amount of the entire active ingredient which enters the systemic circulation blood to the amount of the administered active ingredient is generally known as bioavailability. Various kinds of methods for improving the dissolution of poor solubility active ingredient have been examined conventionally aiming for improvement of the bioavailability and fast-acting of the active ingredient.

Patent Document 13 describes a method of co-pulverizing the poorly water-soluble active ingredient with β-1,4-glucan powder. Since the pulverizing treatment must be continued for an extended period of time until the crystallinity of β-1,4-glucan powder disappeared and strong shearing force must be continuously imposed for a long time with an abrasive roll mixer, this method had a problem that it is inefficient in the actual production. In addition, there was a problem that the β-1,4-glucan which lost crystallinity had a low compression compactability.

Patent Document 14 describes a method of blending β-1,4-glucan, a disintegrator and a surfactant for producing a solid preparation to be orally administered from a poorly water-soluble pharmacological agent by direct tableting method so as to enhance the strength and eliminate variation of the content of the principal agent and to promote degree of degradation of a tablet and dissolution rate of the principal agent. This publication did not mention about pores within a particle and it was not known at all to improve water-solubility of a pharmacological agent by blending a poorly water-soluble active ingredient with porous cellulose particles. In addition, it is needed to blend a surfactant in order to promote dissolution of a poorly water-soluble active ingredient and there remained a problem to be solved that inflammation was caused on the mucous membrane of digestive organs by the surfactant when the solid preparation was administered.

Patent Document 15 describes that when tablets are produced using a poorly water-soluble principal agent and β-1,4-glucan by wet tableting method going through the steps of powder mixing, kneading, granulating and drying, tablets having a high tablet hardness, a short disintegration time and a high dissolution rate of the principal agent are produced by adding a water-soluble polymer solution. This publication did not mention about porous cellulose particles having large pores within a particle and it was not known at all to improve water-solubility of a pharmacological agent by blending a poorly water-soluble active ingredient with porous cellulose particles. In addition, a number of steps relating to drying oil adsorbed materials are essential in such a process, and facilities cost incurred by the process and high energy cost for drying are problems to be solved. Furthermore, there were other problems to be solved such that the process cannot be applied to active ingredients which are deactivated by heat.

In addition, Patent Document 16 describes a method for improving dissolution of a pharmacological agent by mixing a poorly soluble pharmacological agent with cellulose particles with porous structure having a particular specific surface area and pore volume and allowing the former to be sublimated and adsorbed onto the latter which is obtained by dispersing particulate natural cellulose in an organic solvent and granulating and drying it by spray-dry method. The porous cellulose particles described in the document have a high specific surface area and a large pore volume and therefore improvement in dissolution is surely observed when the poorly water-soluble active ingredient is sublimated and adsorbed. However, there is a problem of storage stability in the Examples of this patent document, in which cellulose particles having an excessively high specific surface area are used and the active ingredient sublimated and adsorbed on the surface is amorphous, that the active ingredient partially crystallizes during storage which may change dissolution rate, etc. and further, they had shortcomings that a strongly-bonded molded product composition such as a tablet was hard to collapse due to poor disintegration property and the active ingredient was slow to be eluted.

Sublimable active ingredients have a problem that they exude from the solid preparation during storage and most of these solid preparations have been subjected to film coating or sugarcoating for the purpose of preventing the problem. However, even when such measures was taken, there remained problems that the active ingredient passes through the film layer and goes out of the product, which causes variation of the active ingredient in the preparation, adheres onto the surface of the preparation to cause irritating odor at the time of taking a drug, and recrystallizes within a storage container such as a bottle to significantly reduce the commercial value. In the case of an uncoated preparation, sublimation recrystallization becomes more remarkable compared with a coated preparation.

As already mentioned, since Patent Document 16 used cellulose particles having an excessively high specific surface area and the active ingredient sublimated and adsorbed on the surface thereof has become amorphous, there were problems that storage stability of active ingredient was poor and shortcomings that a strongly-bonded molded product composition such as a tablet was hard to collapse due to poor disintegration property and the active ingredient was slow to be eluted.

In addition, Patent Document 17 describes, as a method for preventing recrystallization of ibuprofen in a solid preparation due to sublimation, a method of storing an ibuprofen-containing solid preparation along with one or two or more stabilizing substances selected from the group consisting of polyvinylpyrrolidone, magnesium oxide and sodium hydrogen carbonate in a closed container such as a bottle. According to such a method, adhesion of crystals to a closed container during storage of the preparation and irritating odor of the preparation are surely alleviated, but it is necessary to put polyvinylpyrrolidone, magnesium oxide, sodium carbonate, etc. in the container as a different preparation, and the process becomes complicated. Therefore, this is utterly different from the preparation containing a sublimable active ingredient of the present invention which provides a single preparation in which sublimation is prevented by putting porous cellulose in the preparation.

Conventionally, a composition containing an active ingredient which is oily, liquid or semisolid at normal temperature causes oozing of a liquid ingredient from the preparation when compressed and shaped and therefore it is more likely to cause troubles in tableting in particular as compared with a solid active ingredient and also has problems of causing spots of the liquid ingredient on the surface of the resulted preparation, flowability defectiveness in the case of a granular preparation, and the like. These problems do not only reduce commercial value significantly but also cause variation of concentration and/or efficacy of the active ingredient and therefore improvement thereof is extremely important.

Patent Documents 18-29 describe a method of holding an active ingredient which is liquid or semisolid at normal temperature as it is onto the adsorbing carrier or holding an active ingredient which has been dissolved, emulsified or suspended in water, an organic solvent, oils and fats, a water-soluble polymer or a surfactant followed by a drying step and compressing and forming the resulted dry powder or granulated powder. However, the active ingredient which is liquid or semisolid at normal temperature may ooze at the time of compression and cause troubles in tableting and sufficiently compressed molded product may not be obtained. In addition, these Patent Documents do not mention about pore volume within a particle with regard to cellulose particles, and it has not been known at all that when the active ingredient which is liquid or semisolid at normal temperature is compressed, addition of porous cellulose aggregate having a large pore volume within a particle of the present invention will prevent oozing by holding the active ingredient which is liquid or semisolid at normal temperature within the particles of the porous cellulose aggregate and facilitate the production of a solid preparation such as powder, granulate and tablet. In addition, a number of steps relating to drying are essential in the processes of Patent Documents 18-29, and facilities cost incurred by the processes and high energy cost for drying are problems to be solved.

As a method of mixing crystalline cellulose and an active ingredient to enhance mixing homogeneity of the active ingredient and reduce the variation of active ingredient, Patent Document 30 discloses a method of mixing a pharmacological agent and talc, light quality silicic anhydride, silicon dioxide hydrate, stearate as a fluidizing agent followed by mixing the mixed powder with other additives in mixing of a pharmacological agent and additives and describes that crystalline cellulose is excellent in miscibility among additives other than the fluidizing agent. However, there was no description at all about pores within a particle of cellulose such as crystalline cellulose, and it has not been known that the mixing homogeneity of an active ingredient can be improved by blending porous cellulose aggregate particles to hold the active ingredient within the particles as in the present invention. This document also describes that the method is preferably applied to a highly aggregating pharmacological agent which is in the form of a fine powder having an average particle size of 40 μm or less to exhibit the effect significantly but the smallest particle size of the pharmacological agent actually described in the Examples of the document is 16 μm and as for the particles pulverized to 10 μm or less for the purpose of enhancing the dispersibility at the time of dosing a poorly water-soluble active ingredient, for example, aggregating properties of the active ingredient were markedly increased and there was a case where sufficient mixing homogeneity was not achieved for conventional crystalline cellulose in which the pore within a particle was small (Comparative Example 31 of the present invention).

[Patent Document 1]: JP-A-01-272643
[Patent Document 2]: JP-A-02-84401
[Patent Document 3]: JP-B-40-26274
[Patent Document 4]: JP-A-53-127553
[Patent Document 5]: JP-A-63-267731
[Patent Document 6]: JP-A-06-316535
[Patent Document 7]: JP-A-11-152233
[Patent Document 8]: WO02/02643
[Patent Document 9]: JP-A-04-283520
[Patent Document 10]: JP-A-07-173050
[Patent Document 11]: JP-A-07-507692
[Patent Document 12]: WO02/36168
[Patent Document 13]: JP-B-53-22138
[Patent Document 14]: JP-A-53-044617
[Patent Document 15]: JP-A-54-052718
[Patent Document 16]: JP-A-03-264537
[Patent Document 17]: JP-A-08-193027
[Patent Document 18]: JP-A-56-7713
[Patent Document 19]: JP-A-60-25919
[Patent Document 20]: JP-A-61-207341
[Patent Document 21]: JP-A-11-193229
[Patent Document 22]: JP-A-11-35487
[Patent Document 23]: JP-A-2000-16934
[Patent Document 24]: JP-A-2000-247869
[Patent Document 25]: JP-A-2001-181
[Patent Document 26]: JP-A-2001-316248
[Patent Document 27]: JP-A-2002-534455
[Patent Document 28]: JP-A-2003-161
[Patent Document 29]: JP-A-2003-55219
[Patent Document 30]: JP-A-2003-81876

DISCLOSURE OF THE INVENTION

Problems to be Solved by the Invention

An object of the present invention is to provide an excipient having an excellent compactability, flowability and disintegration property used for production of a molded product containing various active ingredients by using as a cellulose particle a porous cellulose aggregate having a specific pore diameter and pore volume with a particle.

Means for Solving the Problems

The present inventors have tried to solve the above problems and have come to complete the present invention by controlling particle structure of cellulose aggregate to generate secondary aggregate structure and increasing pore volume within a particle of the cellulose aggregate and controlling the powder property of the cellulose aggregate in a specific range.

That is, the present invention is as follows.

(1) A porous cellulose aggregate having a secondary aggregate structure formed by aggregation of primary cellulose particles, the aggregate having a pore volume within a particle of 0.265 $cm^3/g$ to 2.625 $cm^3/g$, containing type I crystals, and having an average particle size of more than 30 μm and 250 μm or less, a specific surface area of 1.3-20 $m^2/g$, a repose angle of 25° or more and less than 44° and properties to disintegrate in water, (2) The porous cellulose aggregate according to the above (1) wherein the repose angle is 25° to 42°, (3) The porous cellulose aggregate according to the above (1) or (2) wherein a breaking load of a tablet obtained by compressing 0.5 g of the porous cellulose aggregate at 20 MPa is 165 to 410 N, (4) The porous cellulose aggregate according to the above (3) wherein the breaking load is 200 to 410 N and a disintegration time is 75 seconds or less, (5) A process for producing the porous cellulose aggregate according to any one of the above (1) to (4), comprising a step of drying a dispersion containing two or more groups of primary cellulose particles having different average particle sizes and a liquid medium wherein the cellulose dispersion particles have an average particle size of 1 to 110 μm, (6) A molded product composition comprising one or more active ingredients and the porous cellulose aggregate according to any one of the above (1) to (4), (7) The molded product composition according to the above (6) wherein the one active ingredient is a poorly water-soluble active ingredient, (8) The molded product composition according to the above (6) wherein the one active ingredient is a sublimable active ingredient, (9) A molded product composition comprising one or more active ingredients liquid or semisolid at normal temperature and the porous cellulose aggregate according to any one of the above (1) to (4),

(10) A molded product composition comprising one or more active ingredients finely pulverized to a particle size of 40 µm or less and the porous cellulose aggregate according to any one of the above (1) to (4),

(11) A molded product composition comprising one or more active ingredients finely pulverized to a particle size of 10 µm or less and the porous cellulose aggregate according to any one of the above (1) to (4).

Effect of the Invention

The porous cellulose aggregate of the present invention is extremely excellent in compactability, flowability and disintegration property. Therefore, if the porous cellulose aggregate of the present invention is used as an excipient in the production of a molded product containing various active ingredients, a molded product excellent in mixing homogeneity with the active ingredient and having no weight variation, excellent in content homogeneity of the active ingredient, having sufficient hardness, having no troubles in tableting, having low abrasion and excellent in disintegration property can be provided by a simple and easy process.

The porous cellulose aggregate of the present invention is particularly useful in the field of application as an excipient for a solid preparation since it provides extremely good dissolution characteristics, compression characteristics and disintegration property of active ingredient in a solid preparation containing an active ingredient of poorly water-soluble; and since it prevents oozing of a liquid or semisolid active ingredient in a solid preparation containing a liquid or semisolid active ingredient and provides good disintegration property; and in addition, since it can contribute to reducing the variation in mixing rate and density of active ingredient and providing good compression characteristics and disintegration property in mixing an active ingredient and an ingredient other than the active ingredient and in a solid preparation using the same in the case where the active ingredient is contained in a very small amount, particularly in the case where the active ingredient has a small average particle size and a high adhesion aggregation characteristics; and further since it can prevent recrystallization by sublimation of a sublimable active ingredient in a solid preparation of the sublimable active ingredient and can prevent reduction in commercial value.

BEST MODE FOR CARRYING OUT THE INVENTION

Figure 1:
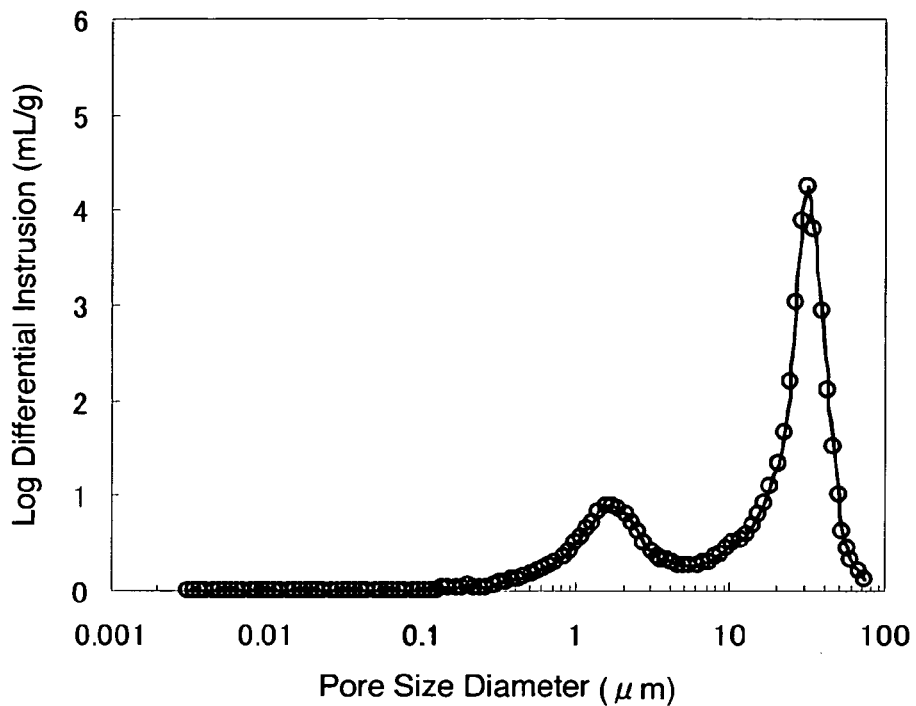
FIG. 1 is a graph of pore distribution of the porous cellulose aggregate A (Example 1) of the present invention measured by mercury porosimetry. A "clear peak" coming from pores within a particle in 0.1-10 µm in the pore distribution was confirmed from FIG. 1. This is almost the same as the pore diameter shown in an electron micrograph by SEM. Another peak shown in 10-50 µn in FIG. 1 comes from spaces among particles.
Figure 2:
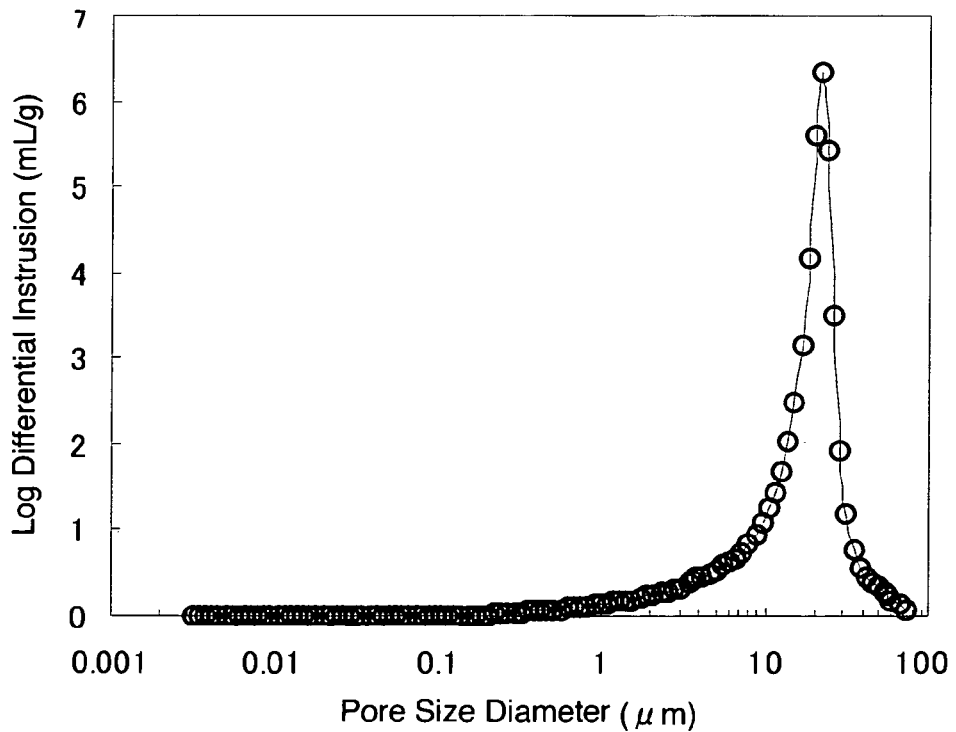
FIG. 2 is a graph of pore distribution of the cellulose powder K (Comparative Example 3) measured by mercury porosimetry. A "clear peak" seen in the porous cellulose aggregate of the present invention was not confirmed. Pores without "clear peak" are those which the original primary cellulose particles have. Another peak seen in 10-50 µm was due to the spaces among particles in consideration of powder particle size distribution.

The present invention is specifically described below, in particular, focused on the preferable embodiments.

The porous cellulose aggregate of the present invention has to have the secondary aggregate structure formed by aggregation of primary particles. This refers to a secondary aggregate structure in which borders among primary particles are clear when the particle surface is observed at 250- and/or 1500-fold magnification in scanning electron microscope (SEM). The secondary aggregate structure formed by aggregation of primary particles is closely related to disintegration property and the case not having this particle structure is not preferable because the disintegration property turns worse. When the borders of primary particles are not clear, for example, the case where there is a film-shaped compact and continuous cellulose partition is not preferable, because the primary cellulose particles continue compactly and are bonded strongly, and particles do not disintegrate in water and the disintegration property of the molded product deteriorates.

In addition, the secondary aggregate structure formed by aggregation of primary particles is not only related to disintegration property but also closely related to dissolution characteristics of the active ingredient. As for porous cellulose particles having the secondary aggregate structure formed by aggregation of primary particles, penetration of water in among the primary particles is fast and disintegration to primary particles is promoted in water and when they hold an active ingredient, they are effective in improving dissolution characteristics of poorly soluble in water active ingredient since the contacting area of the active ingredient with water increases.

In addition, this secondary aggregate structure is distributed uniformly regardless of inside/surface of the particle, and when mixed with an active ingredient, space among the primary cellulose particles can hold the active ingredient and particularly it can prevent oozing of a liquid ingredient, and thus it is preferable.

Furthermore, this secondary aggregate structure can hold the active ingredient not only on the surface of the particles but also inside thereof and therefore it contributes to improvement in mixing rate of the active ingredient and improvement in mixing homogeneity, and can largely reduce density variation, and thus it is preferable.

As for the porous cellulose aggregate of the present invention, pore volume within a particle has to be 0.265 cm$^3$/g to 2.625 cm$^3$/g. Because the porous particle having a large pore volume within a particle is excellent in plastic deformation properties, and the particle is easy to be collapsed at the time of compression, it is excellent in compactability. The porous cellulose aggregate of the present invention has intentionally increased pore volume of aggregated particles as well as the pore volume derived from original cellulose and plastic deformation properties has been increased by changing the structure of particle itself in this way. Therefore it shows high compression compactability regardless of the apparent specific volume of the particle. In the case where the pore volume within a particle is less than 0.265 cm$^3$/g, because there are only pores within a particle which the primary cellulose particle inheres or pores within a particle formed naturally by aggregation of cellulose and not those intentionally formed, it is poor in plastic deformation properties. Because the apparent specific volume of a particle has to be increased to enhance compactability, as a result, flowability of a particle becomes poor. As for the porous cellulose aggregate of the present invention, good compactability can be secured for relatively small appearance specific volume, and as a result, aggregate also excellent in flowability can be obtained.

When pore volume within a particle is 0.265 cm$^3$/g or more, sufficient pore volume is provided within a particle, and active ingredient once taken in the particle or pores on the particle surface in a mixing process and a compression process is hard to dissociate and sufficient amount of the liquid ingredient can be held in pores within a particle, and accordingly, it is excellent in preventing oozing and thus it is preferable, and when a solid active ingredient is used, it can uniformly hold a large amount of finely pulverized active ingredient for the purpose of improving water-dispersibility and a dissolution characteristic, and can prevent recrystallization of a sublimable active ingredient, particularly during storage and can contribute to stabilization and prevention of lowering of commercial value and thus it is preferable and, besides, it can contribute improvement in mixing rate of an active ingredient, improvement in mixing homogeneity and largely reduce density variation and thus it is preferable. When a poorly water-soluble active ingredient once dissolved, suspended or emulsified is used, it is excellent in holding properties of a liquid ingredient and thus it is preferable. It is preferable that the coefficient of variance of drug level, which is an index of density variation of an active ingredient, can be lowered to 3.0% or less in the mixing time, and preferably 2.0% or less, particularly preferably 1.5% or less. Particularly when an active ingredient having an average particle size of 10 μm or less and having very high aggregation characteristics is mixed, the use of particles having pore volume within a particle of 0.265 cm$^3$/g or more as defined in the porous cellulose aggregate of the present invention provides an effect of holding the active ingredient not only on the surface but also inside of the particles and thereby allowing to lower the coefficient of the variance of the drug level and thus it is preferable.

Pore volume within a particle less than 0.265 cm$^3$/g is not preferable because in that case, dispersion homogeneity and holding properties of a solid active ingredient and a liquid active ingredient are deteriorated, which causes variation of the concentration of the active ingredient, aggregation in the solid preparation, deterioration of compression compactability, recrystallization during storage in the case of a sublimable active ingredient and reduction of stability and commercial value, and the effects mentioned above cannot be provided and thus it is not preferable. When the pore volume within a particle exceeds 2.625 cm$^3$/g, apparent specific volume bulk increases and flowability deteriorates, and thus it is not preferable.

The pore size distribution of the porous cellulose aggregate of the present invention is measured, for example, by mercury porosimetry. Particularly, it is preferable that a "clear peak" can be recognized in a range of 0.1-10 μm. In addition, the central pore diameter which is the peak top of pore distribution is closely related with penetration of water into the particle, and the center pore diameter of 0.3 μm or more is preferable. When the central pore diameter is 0.3 μm or more, penetration speed of water increases, and disintegration property is further improved. The larger the central pore diameter is, the more preferable, but it is at most on the order of 5 μn in consideration of the distribution range.

Crystal form of the porous cellulose aggregate of the present invention must be type I. Type I, type II, type III, type IV, etc. are known for a crystal form of cellulose, and particularly among them, type I is called "natural cellulose" and type II is called "regenerated cellulose" and used for general-purpose, but type III and type IV are obtained only in a laboratory scale and not commonly used in an industry scale. Natural cellulose is used for food as a vegetable fiber from ancient times, and now it is widely used as a dispersion stabilizer of a liquid food product and a drug excipient. On the other hand, a regenerated cellulose is regenerated by removing a solution of chemicals such as carbon disulfide and sodium hydroxide and a solvent and changing the crystallographic structure, and is partially used as a shape retaining agent for food products in wet process. Type II crystal, a regenerated cellulose, is not preferable because the particles become rigid due to the change in the crystal form from natural cellulose of type I, and plastic deformation properties at the time of compression decrease, and molded products cannot be provided with sufficient hardness.

As for the porous cellulose aggregate of the present invention, it is necessary that the average particle size is more than 30 μm and 250 μm or less. When the average particle size is 30 μm or less, cellulose particles aggregate, and when it is mixed with an active ingredient, the active ingredient is hard to disperse uniformly, and variation of the active ingredient in an obtained molded product tends to increase, and weight variation of the molded products also tends to increase when produced in series. In addition, separation segregation is readily caused when a formulated powder mixed with an active ingredient having a poor flowability is consecutively compressed, in the case that the average particle size is more than 250 μm.

The specific surface area of the porous cellulose aggregate of the present invention has to be 1.3 m$^2$/g to 20 m$^2$/g. When the specific surface area is less than 1.3 m$^2$/g, the compression shaping properties deteriorates and high hardness and low abrasion are hard to be provided to the molded product. In addition, in the case that the specific surface area is more than 20 m$^2$/g, the contacting area between a cellulose and an active ingredient tends to grow excessively large when blended with an active ingredient which is readily deactivated by a cellulose, which is not preferable because it makes the active ingredient more easily deactivated.

The repose angle of the porous cellulose aggregate of the present invention has to be 25° more and less than 44°. An active ingredient is usually prepared so that it may quickly spread in gastric fluid and/or intestinal fluid media and increase efficacy when administered, and it is often pulverized or originally fine particles. Because they are fine powder, a flow property is poor, but the repose angle of a cellulose powder more than 44° is not preferable in the point of flowability of the case where a poorly flowable active ingredient is blended in a large amount. Weight variation of a molded product particular in high-speed compression of several thousands to several ten thousands tablets/hour tends to be large. The smaller the repose angle is, the better the flowability is, but 25-42° is particularly excellent. More preferably it is 25-40°. The repose angle less than 25° is not preferable in the point of separation segregation from the active ingredient.

The apparent specific volume of the porous cellulose aggregate of the present invention has to be 2.0-6.0 cm$^3$/g. Since the porous cellulose aggregate of the present invention has a porous structure, it has hardness, flowability and disintegration property in a good balance over the almost whole area of the apparent specific volume as compared with conventional products. It is preferable that the apparent specific volume is 2.0 cm$^3$/g or more to give high compression compactability and 6.0 cm$^3$/g or less to give high flowability. Particularly preferably, it is 2.5-5.0 cm$^3$/g.

It is preferable that the quantity of anchoring water of the porous cellulose aggregate of the present invention is 0.01 g or more measured by DSC. It is said that there are three kinds of water, i.e., free water, anchoring water and nonfreezing water in a cellulose particle. Free water and anchoring water shown here are shown by peak area of near 0° C. and peak area of −30 to 40° C. measured by differential scanning calorie analysis (DSC)(With DSC7 manufactured by PERKIN ELMER, measured at measurement temperature of −50 to 30° C. and temperature increasing rate of 10° C.), and non-freezing water corresponds to the one which does not appear as a peak in DSC and corresponds to the difference by subtracting free water and anchoring water from the total moisture quantity measured by Karl Fisher method. Because the compression compactability increases as the anchoring water increases, and thus it is preferable, and the upper limit thereof is not particularly limited. The amount of the anchoring water is preferably 0.15 g or more, and more preferably 0.20 g or more.

It is preferable that the porous cellulose aggregate of the present invention has a surface free energy ($\gamma_s^d$) of 65 mJ/m$^2$ or less measured by inverse gas chromatograph (IGC: the product of Surface Measurement System Ltd., 303K, relative humidity 0%). It is said that cellulose particles have surface free energy on the particle surface. The surface free energy is a parameter expressing surface appearance of a particle calculated by retention time when a sample is fed into an IGC column, and organic solvent gases different in polarity such as decane, nonane, octane, hexane, chloroform, ethyl acetate, acetone, 1,4-dioxane, ethanol and methane are passed through the column, and it can be expressed as $\gamma_s^d$ obtained by the following formula:

$$RT\ln V_R^0 = 2N_A (\gamma_S^d)^{\frac{1}{2}} a(\gamma_L^d)^{\frac{1}{2}} + const \qquad \text{[Formula 1]}$$

Wherein each symbol in the above formula is respectively represents as follows:
R: Gas constant (Jmol$^{-1}$K$^{-1}$),
T: Column temperature (K),
$V_R^0$: Retention volume (cm$^3$) of gas,
N: Avogadro constant (mol$^{-1}$),
$\gamma_s^d$: Surface free energy (mJm$^{-2}$) of a particle,
a: Molecule cross-section area (cm$^2$) of an adsorption ingredient,
$\gamma_L^d\gamma$: Surface tension of an adsorption ingredient in the liquid state;
and the surface free energy $\gamma_s^d$ can be expressed as a slope when RTlnV$_R^0$ (kJ/mol): measured value and a($\gamma_s^d$)$^{1/2}$(m$^2$/(J/m$^2$)$^{1/2}$): pre-determined value are plotted.

Particularly preferably, the surface free energy is 60 mJ/m$^2$ or less. This surface free energy contributes to flowability of a cellulose particle and the smaller, the better. The lower limit is not limited in particular.

As for the porous cellulose aggregate of the present invention, it is preferable that the hardness of columnar molded products to be obtained by weighing 0.5 g of cellulose powder, putting it in a mortar (manufactured by Kikusui Seisakusho, Ltd. using materials SUS2,3), and compressing it with a round plane mallet of a diameter of 1.1 cm (manufactured by Kikusui Seisakusho, Ltd. using materials SUS2,3) until the pressure reaches 10 MPa and 20 Mpa (manufactured by Aikoh Engineering with PCM-1A, compression velocity of 1 cm/min) under a condition of holding it by the aimed pressures for 10 seconds is 60 N or more and 165 N or more, respectively. When the hardness at 10 MPa is less than 60 N or the hardness at 20 MPa is less than 165 N under respective conditions, the hardness of the molded products produced by blending an active ingredient in a large amount and under condition of several ten thousands to several hundred thousands tablets/hour is low, and troubles in tableting such as abrasion or capping tend to occur. The higher the tablet hardness shown here is, the better, but the hardness for 10 Mpa is 160 N and the hardness for 20 MPa is 450 N at most.

As for the porous cellulose aggregate of the present invention, the case where hardness of columnar molded products to be obtained by compressing until the above-mentioned pressure reaches 20 Mpa is 165-410 N, preferably 200-410 N, is particularly excellent.

As for the porous cellulose aggregate of the present invention, it is preferable that disintegration time of a columnar molded product obtained by compressing till 20 MPa by the method mentioned above under a condition of holding it by the aimed pressure for 10 seconds is 75 seconds or less at a point of disintegration property. Particularly preferably it is 50 seconds or less. The shorter the disintegration time is, the better. An active ingredient is usually prepared so that it may spread in gastric fluid and/or intestinal fluid media and quickly increase efficacy when administered, but when the disintegration time of molded product is longer, dissolution of a pharmacological agent from the molded product takes time and it is not absorbed in digestive organs immediately and the immediate effect tends to decrease.

As for the porous cellulose aggregate of the present invention, it is preferable that 200 mg weight of molded products to be obtained by putting 55 parts by weight of acetaminophen (product made by API Co., Ltd., a powder type), 0.25 part by weight of light silicic anhydride (manufactured by NIPPON AEROSIL CO., LTD, trade name, AEROSIL 200), 27 part by weight of cellulose particle, 2 part by weight of crospovidone (manufactured by BASF, trade name, Kollidon CL) and 15 parts by weight of granulated lactose (manufactured by Lactose New Zealand, trade name, Super-Tab) in a 100 L scale V-type mixer (manufactured by dalton Corporation, mixing for 30 minutes, and subsequently adding 0.5 part by weight of magnesium stearate (Taihei Chemical Industrial Co., Ltd., derived from plant) and further mixing for 5 minutes to obtain a formulated powder, and punching the formulated powder in a rotary tablet machine (Kikusui Seisakusho, Ltd., trade name, LIBRA-II, rotating plate $\phi$ 410 mm for 36 mallets) using a mallet having a diameter of 8 mm, 12R, under the turning table rotation of 50 rpm, compressive force 7.5 kN, have a hardness of 50 N or more, and abrasion degree of less than 1%, and do not troubles in tableting.

An excipient with high compactability is necessary to give hardness to a formulation containing a poorly formable pharmacological agent in a large amount and to reduce abrasion degree, and when consecutive forming is made at a high-speed, an excipient with high flowability is necessary to reduce weight variation. Such a production of a molded product with a formulation containing a poorly formable pharmacological agent in a large amount and at high speed punching is first brought to be realized by blending an excipient excellent in compactability and excellent in flowability as in the present invention. When the hardness of the molded product is less than 50 N, or the abrasion degree is 1% or more, abrasion, flying powder, crack and chip may occur during transportation, and thus it is not preferable. When troubles in tableting occur, they lead to a production of defective products, and thus it is not preferable. The higher the hardness shown here is, the better, but it is 100 N at most, and the lower the abrasion degree is, the better.

The production process of the cellulose powder of the present invention is described below.

The porous cellulose aggregate of the present invention can be obtained by drying a dispersion containing two or more cellulose dispersion particle groups having different average particle sizes and a liquid medium wherein the average particle sizes of the cellulose dispersion particles are 1 to 110 μm.

The cellulose dispersion particle groups as used in the present invention consist of natural cellulosic materials.

A natural cellulosic material is derived from either plant or animal, and for example, a fibrous material derived from natural product which contains cellulose such as wood, bamboo, straw, rice straw, cotton, ramie, bagasse, kenaf, beat, sea squirt, bacterial cellulose, and it is preferable to have a crystalline structure of cellulose type I. As raw materials, one kind of natural cellulosic material of the above can be used or a mixture of two or more of them can be used, either. It is preferable to use it in the form of purified pulp, but there is no particular limitation in the purification method of pulp, and dissolving pulp, kraft pulp, NBKP pulp or any pulps may be used. A natural cellulosic material may be a raw material such as hydrolyzed pulp or non-hydrolyzed pulp. Particularly, when it is hydrolyzed, hydrolysis may be acid hydrolysis, alkali oxidative degradation, hydrothermal degradation, steam explosion or the like. Any one of them or combination thereof may be used.

As a medium using in the above production process where the medium is used to disperse solid contents in a suitable medium afterwards, water is preferable, but there is no particular limitation as far as it can be used industrially and, for example, water and/or an organic solvent may be used. Examples of organic solvent include alcohols such as methanol, ethanol, isopropanol, butyl alcohol, 2-methylbutyl alcohol, benzyl alcohol, hydrocarbons such as pentane, hexane, heptane, cyclohexane, ketones such as acetone, ethyl methyl ketone. Particularly, it is preferably to use organic solvents which is used for a pharmaceutical products, and includes those classified as a solvent in "Iyakuhin Tenkabutsu Jiten" (Encyclopedia of Pharmaceutical Additives) (published by YAKUJI NIPPO LIMITED.). Either water or organic solvent alone or combinations of two or more of them may be used, or after the ingredient is dispersed in a medium, the medium may be removed and then the ingredient may be dispersed in another medium.

The porous cellulose aggregate of the present invention can be obtained by drying a cellulose dispersion containing two or more cellulose dispersion particle groups having different average particle sizes. There is no particular limitation on the average particle size of each cellulose dispersion particle group, but 1-110 μm is preferable. According to the present invention, it is only required that two or more cellulose dispersion particle groups having different average particle sizes within this average particle size range should be contained and those having any average particle sizes may be blended unless each of them has a same average particle size. For example, when two kinds of cellulose dispersion particle groups having different average particle sizes are mixed, it is preferable that the larger one has an average particle size of 10-110 μm and the smaller one has an average particle size of 0.005-0.99 times the average particle size of the larger one. More preferably, it is preferable that the smaller one has an average particle size of 0.01-0.8 times the average particle size of the larger one. Most preferably, it is preferable that the smaller one has an average particle size of 0.01-0.7 times the average particle size of the larger one.

By mixing two or more cellulose dispersion particle groups having different average particle sizes can provide a large pore volume within a particle. When the cellulose dispersion is dried, cellulose dispersion particles having a smaller average particles diameter enter among the cellulose dispersion particle ingredient having a larger average particles diameter, and contribute to inhibiting an excessive aggregation among cellulose dispersion particles having a larger average particle size, and take a secondary aggregate structure comprising each of them as primary particles.

The weight ratio of the cellulose particle group having a larger average particle size to the cellulose particle group having a smaller average particle size, depends on the purpose, is usually preferable within a range of 5/95-95/5. More preferably, within 10/90-90/10, and more preferably within 20/80-80/20. The value of pore volume of the present invention can be controlled by selecting a suitable weight ratio.

In addition, as for the particle shape of the cellulose particle composition having a larger average particle size mentioned above, those having a ratio (L/D) of the each average value of the major and minor diameters of 2.0 or more are preferably used. The larger L/D is, the more profound effect to inhibit excessive particle aggregation at the time of drying exerts. Therefore the large 40 contributes to providing a large pore volume within a particle.

There is no particular limitation on the process for obtaining a dispersion from a cellulose particle composition having two or more different average particle sizes as mentioned above. Each of the processes: i) a process comprising preparing each of plural cellulose particle compositions having different average particle size separately, and mixing these plural cellulose particle dispersions; ii) a process comprising treating a part of one cellulose particle composition to prepare one having different average particle size and mixing them; and iii) a process comprising fractionating a cellulose particle compositions having one average particle size, treating each portion respectively to prepare those having different average particle size respectively and mixing them. One kind of the production processes i-iii) may be used alone, or two kinds or more of them may be optionally used together. The treatment process performed here may be a wet process or a dry process, and those respectively obtained by wet processes may be mixed together before drying, those respectively obtained by dry processes may be mixed together before drying or those respectively obtained by a wet process or a dry process may be combined. There is no particular limitation on the process including well-known methods, and for example, grinding and/or pulverizing may be performed and classification using a screen, centrifugal separation using a cyclone or centrifuge may be used, and even a method which put them together may be applied.

Grinding method may be a grinding method using agitation blade such as one-direction rotation type, multi-axis rotation type, reciprocal inversion type, vertical movement type, rotation+ vertical movement type, piping type such as a portable mixer, a three-dimensional mixer, a side-wall mixer, jet type agitation grinding method such as a line mixer, grinding methods using a high shear homogenizer, high pressure homogenizer, a supersonic wave homogenizer, and a grinding method using an axial rotation extruder, for example, a kneader. Pulverizing method may be any method including a screen-type pulverizing method such as a screen mill and a hammer mill, blade rotation shear screen type pulverizing method such as a flush mill, air stream type pulverizing method such as a jet mill, ball type pulverizing methods such as a ball mill and a vibratory ball mill, a blade agitation type pulverizing method, etc.

It is preferable that cellulose dispersion particle aggregate obtained by an operation as above is made into a dispersion having a concentration of 5-40 wt % before drying. When this concentration is less than 5 wt %, the average particle size of the obtained cellulose particle is so small that self-flowability tends to be impaired. In addition, when this concentration exceeds 40 wt %, apparent specific volume of the cellulose particle is so small that compression compactability tends to be impaired. Preferably it is 10-40 wt %, and more preferably it is 15-40 wt %.

In addition, it is preferable that the average particle size of cellulose dispersion particles existing in the above cellulose fluid dispersion having a concentration of 5-40 wt % is 1-110 μm. When the average particle size exceeds 110 μm, the cellulose particles after drying grows excessively large, and depending on a kind of the active ingredient, there are cases to cause separation segregation when mixed with it. On the other hand, when the average particle size is less than 1 μm, the cellulose particle after drying is excessively small and it is hard to keep good flowability. Preferably it is 5-90 μm, and more preferably it is 10-80 μm. The average particle size as used here can be determined by technique generally used for volume particle size distribution measurement measured with, for example, an optical laser diffraction-type particle size distribution meter (manufactured by HORIBA, trade name, LA-910 type).

The above average particle size can be controlled into a desired range by adjusting polymerization degree of raw material cellulose by hydrolysis and hydrolysis of cellulose and/or agitation force at a dispersion step. Generally when the acid concentration or the alkali concentration, reaction temperature of hydrolysis solution is increased, there is a tendency that the cellulose polymerization degree decreases and the cellulose average dispersion particle size of the dispersion decreases; and when the agitation force in a solution is strengthened, there is a tendency that the average particle size of the cellulose dispersion particle decreases.

There is no particular limitation on the drying method and for example, any of lyophilization, spray drying, drum drying, shelf drying, air stream drying and vacuum drying may be used, and one of them may be used alone or two or more of them may be used together. When spray drying is performed, spraying method may be any spray drying method such as a disc type, pressure nozzle type, compressed two-fluid nozzle type and compressed four-fluid nozzle type, and one of them can be used singly or two or more of them can be used in combination.

When the spray drying is performed, a very small amount of water-soluble polymer, surfactant may be added for the purpose of lowering the surface tension of the dispersion, or a blowing agent or gas may be added to the dispersion for the purpose of promoting vaporization rate of the medium.

Examples of water-soluble polymer include hydroxypropylcellulose, hydroxypropyl methylcellulose, polyacrylic acid, carboxyvinyl polymer, polyethylene glycol, polyvinyl alcohol, polyvinylpyrrolidone, methyl cellulose, Arabian gum, starch and other water-soluble polymers described in "Iyakuhin Tenkabutsu Jiten" (Encyclopedia of Pharmaceutical Additives) (published by YAKUJI NIPPO LIMITED.) and they can be optionally used singly or two or more of them can be used in combination.

Examples of surfactant include phospholipids, glycerin fatty acid ester, polyethylene glycol fatty acid ester, sorbitan fatty acid ester, polyoxyethylene hydrogenated castor oil, polyoxyethylene cetyl ether, polyoxyethylene stearyl ether, polyoxyethylene nonyl phenyl ether, polyoxyethylene polyoxypropylene glycol, polyoxyethylene sorbitan monolaurate, polysorbate, sorbitan monooleate, monostearin acid glyceride, monooxyethylene sorbitan monopalmitate, monooxyethylene sorbitan monostearate, polyoxyethylene sorbitan monooleate, sorbitan monopalmitate, sodium lauryl sulfate, etc., which are classified as surfactant in "Iyakuhin Tenkabutsu Jiten" (Encyclopedia of Pharmaceutical Additives) (published by YAKUJI NIPPO LIMITED.) and they can be optionally used singly or two or more of them can be used in combination.

Examples of blowing agent include tartaric acid, sodium hydrogen carbonate, potato starch, anhydrous citric acid, medicinal soap, sodium sulfate laurate, diethanolamide laurate, laumacrogol, and other blowing agents described in "Iyakuhin Tenkabutsu Jiten" (Encyclopedia of Pharmaceutical Additives) (published by YAKUJI NIPPO LIMITED.) and they can be optionally used singly or two or more kinds can be used in combination. In addition, as well as pharmaceutical additives, bicarbonates which are heat-decomposed and generate gas such as sodium hydrogen carbonate and ammonium hydrogen carbonate, carbonates which are reacted with an acid to generate gas such as sodium carbonate and ammonium carbonate may be used. When carbonates mentioned above are used, they have to be used with an acid. Examples of acid include organic acids such as citric acid, acetic acid, ascorbic acid and adipic acid, proton acids such as hydrochloric acid, sulfuric acid, phosphoric acid and nitric acid, Lewis acid such as boron fluoride and other acid materials, and those used as a drug and/or a food product are preferable but substances other than those have a similar effect. Instead of blowing agent, gas such as nitrogen, carbon dioxide, liquefied petroleum gas, dimethylether may be impregnated with dispersions.

It is only required that these water-soluble polymer, surfactant, gas generating substances be added before drying, and there is no particular limitation on the adding timing.

It is only required that the molded product composition as used in the present invention should contain one or more kinds of active ingredients and a porous cellulose aggregate of the present invention, and there is no particular limitation on the amount but normally range of use is 0.001-99% for the active ingredient and 1-99% for the cellulose powder of the present invention. Furthermore, the molded product composition of the present invention can be processed by well-known methods such as mixing, agitation, granulation, particle size regulation and tableting. When the active ingredient is under 0.001%, sufficient amounts for treatment cannot be secured, while it exceeds 99%, the porous cellulose aggregate of the present invention is under 1%, and molded products showing practical hardness, abrasion degree and disintegration are hard to be obtained. The molded product composition of the present invention may optionally contain an excipient, a disintegrator, a binder, a fluidizing agent, a lubricant, a corrigent, a flavor, a pigment, a sweetening agent in addition to the active ingredient and cellulose particles if necessary.

Examples of molded product composition as used in the present invention include tablet, powder (including powder for punching), fine grain (including fine grain for punching), granule, extract agent and pill when they are used for pharmaceutical products. They may be subjected to coating which is not limited as far as prepared by general methods without relation to shape or weight. As well as pharmaceutical products, those used for food products such as confectioneries, health foods, texture improver, dietary fiber supplements, cake makeup, bath salt, animal drug, diagnostic drug, plant protective, fertilizer, ceramics catalytic substance are also included in the present invention.

The active ingredient as used in the present invention refers to pharmaceutically active ingredients, plant protective ingredients, fertilizer ingredients, animal feeding ingredients, food ingredients, cosmetic ingredients, pigments, flavors, metals, ceramics, catalytic substances and surfactants and they may be in any form of solid (powder, crystal, etc.), oil, liquid or semisolid. They may be subjected to coating for the purpose of controlling dissolution, reducing bitterness, etc. Single active ingredient can be used or singly or two or more of them can be used in combination. The active ingredient can be used being emulsified, dissolved or suspended in a medium.

For example, pharmaceutically active ingredient encompasses antipyretic analgesic antiphlogistic agent, hypnosedative agent, antihypnotic agent, antidinic agent, infant analgesic agent, stomachic agent, antacid agent, digestive agent, cardiotonic agent, antiarrhythmic agent, antihypertensive agent, vasodilative agent, diuretic agent, antiulcer agent, antiflatulent agent, therapeutic agent for osteoporosis, antitussive expectorant agent, antiasthmatic agent, antifungus agent, micturition improvement agent, revitalizer, vitamin agent and other orally administered agents. Pharmaceutically active ingredients can be optionally used singly or two or more of them can be used in combination.

Examples of pharmaceutically active ingredient used in the present invention include aspirin, aspirin aluminum, acetaminophen, ethenzamide, sazapirin, salicylamide, lactyl phenetidine, isothipendyl hydrochloride, diphenylpyraline hydrochloride, diphenhydramine hydrochloride, difeterol hydrochloride, triprolidine hydrochloride, tripelennamine hydrochloride, thonzylamine hydrochloride, fenethazine hydrochloride, methdilazine hydrochloride, diphenhydramine salicylate, carbinoxamine diphenyldisulfonate, alimemazine tartrate, diphenhydramine tannate, diphenylpyraline teoclate, mebhydrolin napadisylate, promethazine methylene disalicylate, carbinoxamine maleate, chlorophenylamine dl-maleate, chlorophenylamine d-maleate, difeterol phosphate, alloclamide hydrochloride, cloperastine hydrochloride, pentoxyverine citrate (carbetapentane citrate), tipepidine citrate, sodium dibunate, dextromethorphan hydrobromide, dextromethorphan phenolphthalinate, tipepidine hibenzate, cloperastine fendizoate, codeine phosphate, dihydrocodeine phosphate, noscapine hydrochloride, noscapine, dl-methylephedrine hydrochloride, dl-methylephedrine saccharin salt, potassium guaiacolsulfonate, guaifenesin, caffeine and sodium benzoate, caffeine, anhydrous caffeine, vitamin B1 and derivatives thereof and salts thereof, vitamin B2 and derivatives thereof and salts thereof, vitamin C and derivatives thereof and salts thereof, hesperidin and derivatives thereof and salts thereof, vitamin B6 and derivatives thereof and salts thereof, nicotinamide, calcium pantothenate, aminoacetate, magnesium silicate, synthetic aluminum silicate, synthetic hydrotalcite, magnesium oxide, dihydroxyaluminum-aminoacetate (aluminum glycinate), aluminum hydroxide gel (as dried aluminum hydroxide gel), dried aluminum hydroxide gel, dried gel of aluminum hydroxide/magnesium carbonate mixture, coprecipitation product of aluminum hydroxide/sodium hydrogen carbonate, coprecipitation product of aluminum hydroxide/calcium carbonate/magnesium carbonate, coprecipitation product of magnesium hydroxide/potassium aluminum sulfate, magnesium carbonate, magnesium aluminometasilicate, ranitidine hydrochloride, cimetidine, famotidine, naproxen, sodium diclofenac, piroxicam, azulene, indometacin, ketoprofen, ibuprofen, difenidol hydrochloride, diphenylpyraline hydrochloride, diphenhydramine hydrochloride, promethazine hydrochloride, meclizine hydrochloride, dimenhydrinate, diphenhydramine tannate, fenethazine tannate, diphenylpyraline teoclate, diphenhydramine fumarate, promethazine methylene disalicylate, scopolamine hydrobromide, oxyphencyclimine hydrochloride, dicyclomine hydrochloride, metixene hydrochloride, atropine methylbromide, anisotropine methylbromide, scopolamine methylbromide, l-hyoscyamine methylbromide, methylbenactyzium bromide, belladonna extract, isopropamide iodide, diphenylpiperidinomethyldioxolane iodide, papaverine hydrochloride, aminobenzoic acid, cesium oxalate, ethyl piperidylacetylaminobenzoate, aminophylline, diprophylline, theophylline, sodium hydrogen carbonate, fursultiamine, isosorbide dinitrate, ephedrine, cefalexin, ampicillin, sulfixazole, sucralfate, allylisopropylacetylurea, bromovalerylurea, mahuang, Nandina fruit, Cherry bark, Polygalae radix, Licorice root, Platycodon grandiflorum, Plantaginis semen, Plantaginis herba, Senegae radix, Fritillaria verticillata, fennel, Phellodendron bark, Coptis root, zedoary, chamomile, Cinnamon bark, Gentiana, oriental bezoar, beast gall (including Fel Ursi), Glehniae radix, Zingiberis rhizoma, Atractylodis lanceae, clove, Aurantii Nobilis Pericarpium, Atractylodis rhizoma, Lumbricus, Panacis Japonici rhizoma, Ginseng radix, Japanese valerian, Moutan cortex, Zanthoxyli fructus and these extract, insulin, vasopressin, interferon, urokinase, serratio peptidase, somatostatin and other pharmaceutically active ingredients described in "Japanese Pharmacopeia", "Japanese Standards for Pharmaceutical Ingredients", "USP", "NF" and "EP", and one selected from the above can be optionally used singly or two or more of them can be used in combination.

The poorly water-soluble active ingredient as used in the present invention refers to, for example, a pharmaceutically active ingredient and for which 1 g of dissolved substance needs 30 mL or more amount of water by the 14th revision of the Japanese Pharmacopeia. If it is poorly soluble in water, an effect can be obtained regardless of sublimability and degree of surface polarity by blending it with a composition of the present invention as an active ingredient.

Examples of poorly water-soluble solid active ingredient include antipyretic analgesic agents such as acetaminophen, ibuprofen, benzoic acid, ethenzamide, caffeine, camphor, quinine, calcium gluconate, dimercaprol, sulfamine, theophylline, theobromine, riboflavin, mephenesin, phenobarbital, aminophylline, thioacetazone, quercetin, rutin, salicylic acid, theophylline sodium salts, pyrabital, quinine hydrochloride, irgapyrin, digitoxin, griseofulvin, phenacetin, nervous system drug, sedation narcotics, muscle relaxant, hypotensive agent, antihistamines, antibiotics such as acetylspiramycin, ampicillin, erythromycin, kitasamycin, chloramphenicol, triacetyloleandomycin, nystatin, colistin sulfate, steroid hormones such as methyltestosterone, methylandrosteronediol, progesterone, estradiol benzoate, ethinylestradiol, deoxycorticosterone acetate, cortisone acetate, hydrocortisone, hydrocortisone acetate, prednisolone, non-steroid yolk hormones such as dienestrol, hexastrol, diethylstilbestrol, diethylstilbestrol dipropionate, chlorotrianisene, others lipid soluble vitamins, and other pharmaceutically active ingredients described in "Japanese Pharmacopeia", "Japanese Standards for Pharmaceutical Ingredients", "USP", "NF" and "EP", and one selected from the above can be optionally used singly or two or more of them can be used in combination.

Examples of poorly water-soluble oily or liquid active ingredient used in the present invention include teprenone, indometacin farnesyl, menatetrenone, phyionadione, vitamin group such as vitamin A oil, fenipentol, vitamin D and vitamin E, higher unsaturated fatty acids such as DHA (docosahexaenoic acid), EPA (eicosapentaenoic acid) and liver oil, coenzyme Q, oil soluble flavors such as orange oil, lemon oil and peppermint oil, and other pharmaceutically active ingredients described in "Japanese Pharmacopeia", "Japanese Standards for Pharmaceutical Ingredients", "USP", "NF" and "EP". Vitamin E includes various kinds of homologue and derivatives, but it is not limited in particular as far as it is liquid at normal temperature. Examples thereof include dl-α-tocopherol, dl-α-tocopherol acetate, d-α-tocopherol and d-α-tocopherol acetate, and one selected from the above can be optionally used singly or two or more of them can be used in combination.

Examples of poorly water-soluble semisolid active ingredient used in the present invention include traditional Chinese medicine or galenical extracts such as Lumbricus, Licorice root, Cinnamon bark, Peony root, Moutan cortex, Japanese valerian, Zanthoxyli fructus, Zingiberis rhizoma, Aurantii Nobilis Pericarpium, mahuang, Nandina fruit, Cherry bark, Polygalae radix, Platycodon grandiflorum, Plantaginis semen, Plantaginis herba, Lycoris radiata, Senegae radix, Fritillaria verticillata, fennel, Phellodendron bark, Coptis root, zedoary, chamomile, Gentiana, oriental bezoar, beast gall, Glehniae radix, Zingiberis rhizoma, Atractylodis lanceae, clove, Aurantii Nobilis Pericarpium, Atractylodis rhizoma, Panacis Japonici rhizoma, Ginseng radix, Kakkonto, Keishito, Kososan, Saikokeishito, Shosaikoto, Shoseiryuoto, Bakumondoto, Hangekobokuto, Maoto, or oyster extract, propolis and propolis extract, coenzyme Q, and one selected from the above can be optionally used singly or two or more of them can be used in combination. The other bioactive ingredients as well as the poorly water-soluble active ingredient mentioned above may be added to the solid preparation composition of the present invention.

The finely pulverized active ingredients used in the present invention refer to those finely pulverized to below 1-40 μm for the purpose of improving dispersibility of poorly water-soluble solid active ingredients or improving mixing homogeneity of active ingredients having efficacy in a very small amount, for example. The larger the effect of the present invention is, the smaller the average particle size of the active ingredient is. The average particle size of active ingredient is preferably 1-20 μm and more preferably 1-10 μm.

The sublimable active ingredient as used in the present invention is not particularly limited as far as it has sublimability and it may be solid, liquid or semisolid at normal temperature and either the state is acceptable.

Examples of sublimable active ingredient include benzoic acid, ethenzamide, caffeine, camphor, salicylic acid, phenacetin, ibuprofen and the other sublimable pharmaceutically active ingredients described in "Japanese Pharmacopeia", "Japanese Standards for Pharmaceutical Ingredients", "USP", "NF" and "EP", and one selected from the above can be optionally used singly or two or more of them can be used in combination. The other active ingredients as well as the sublimable active ingredient mentioned above may be added to the solid preparation composition of the present invention.

Examples of active ingredient which is liquid at normal temperature and used in the present invention include teprenone, indometacin farnesyl, menatetrenone, phyionadione, vitamin group such as vitamin A oil, fenipentol, vitamin D and vitamin E, higher unsaturated fatty acids such as DHA (docosahexaenoic acid), EPA (eicosapentaenoic acid) and liver oil, coenzyme Q, oil soluble flavors such as orange oil, lemon oil and peppermint oil, and other pharmaceutically active ingredients described in "Japanese Pharmacopeia", "Japanese Standards for Pharmaceutical Ingredients", "USP", "NF" and "EP". Vitamin E includes various kinds of homologue and derivatives, but it is not limited in particular as far as it is liquid at normal temperature. Examples thereof include dl-α-tocopherol, dl-α-tocopherol acetate, d-α-tocopherol and d-α-tocopherol acetate, and one selected from the above can be optionally used singly or two or more of them can be used in combination.

Examples of active ingredient which is semisolid and used in the present invention include traditional Chinese medicine or galenical extracts such as Lumbricus, Licorice root, Cinnamon bark, Peony root, Moutan cortex, Japanese valerian, Zanthoxyli fructus, Zingiberis rhizoma, Aurantii Nobilis Pericarpium, mahuang, Nandina fruit, Cherry bark, Polygalae radix, Platycodon grandiflorum, Plantaginis semen, Plantaginis herba, Lycoris radiata, Senegae radix, Fritillaria verticillata, fennel, Phellodendron bark, Coptis root, zedoary, chamomile, Gentiana, oriental bezoar, beast gall, Glehniae radix, Zingiberis rhizoma, Atractylodis lanceae, clove, Aurantii Nobilis Pericarpium, Atractylodis rhizoma, Panacis Japonici rhizoma, Ginseng radix, Kakkonto, Keishito, Kososan extract granules, Saikokeishito, Shosaikoto, Shoseiryuoto, Bakumondoto, Hangekobokuto, Maoto, or oyster extract, propolis and propolis extract, coenzyme Q, and one selected from the above can be optionally used singly or two or more of them can be used in combination.

Examples of excipient include acrylated starch, L-asparagic acid, aminoethyl sulfonic acid, aminoacetate, wheat gluten (powder), Arabian gum, powdered acacia, alginic acid, sodium alginate, alfa-starch, pumice grain, inositol, ethyl cellulose, ethylene-vinyl acetate copolymer, sodium chloride, olive oil, porcelain clay, cacao butter, casein, fructose, pumice grain, carmellose, carmellose sodium, silicon dioxide hydrate, dry yeast, dried aluminum hydroxide gel, dried sodium sulfate, dried magnesium sulfate, agar, agar powder, xylitol, citric acid, sodium citrate, disodium citrate, glycerin, calcium glycerophosphate, sodium gluconate, L-glutamine, clay, clay 3, clay grain, croscarmellose sodium, crospovidone, magnesium aluminosilicate, calcium silicate, magnesium silicate, light silicic anhydride, light liquid paraffin, cinnamon powder, crystalline cellulose, crystalline cellulose-carmellose sodium, crystalline cellulose (grain), brown rice malt, synthetic aluminum silicate, synthetic hydrotalcite, sesame oil, wheat flour, wheat starch, wheat germ powder, rice powder, rice starch, potassium acetate, calcium acetate, cellulose acetate phthalate, safflower oil, white beeswax, zinc oxide, titanium oxide, magnesium oxide, β-cyclodextrin, dihydroxyaluminum aminoacetate, 2,6-dibutyl-4-methylphenol, dimethylpolysiloxane, tartaric acid, potassium hydrogen tartrate, plaster, sucrose fatty acid ester, alumina magnesium hydroxide, aluminum hydroxide gel, aluminum hydroxide/sodium hydrogen carbonate coprecipitate, magnesium hydroxide, squalane, stearyl alcohol, stearic acid, calcium stearate, polyoxyl stearate, magnesium stearate, soybean hardened oil, purified gelatine, purified shellac, purified sucrose, purified sucrose spherical granulated powder, cetostearyl alcohol, polyethylene glycol 1000 monocetyl ether, gelatine, sorbitan fatty acid ester, D-sorbitol, tricalcium phosphate, soybean oil, unsaponified soy bean, soy bean lecithin, powdered skim milk, talc, ammonium carbonate, calcium carbonate, magnesium carbonate, neutral anhydrous sodium sulfate, low substitution degree hydroxypropylcellulose, dextran, dextrin, natural aluminum silicate, Indian corn starch, powdered tragacanth, silicon dioxide, calcium lactate, lactose, lactose granulated substance, par filler 101, white shellac, white vaseline, white clay, sucrose, sucrose/starch spherical granulated powder, naked barley green leaf extract, dried powder of bud and leaf juice of naked barley, honey, paraffin, potato starch, semi-digested starch, human serum albumin, hydroxypropyl starch flour, hydroxypropylcellulose, hydroxypropylcellulose, hydroxypropyl methylcellulose phthalate, hydroxypropyl methylcellulose phthalate, phytic acid, glucose, glucose hydrate, partially pregelatinized starch, pullulan, propylene glycol, starch syrup of reduced malt sugar powder, powdered cellulose, pectin, bentonite, sodium polyacrylate, polyoxyethylene alkyl ether, polyoxyethylene hydrogenated castor oil, polyoxyethylene (105) poly oxypropylene (5) glycol, polyoxyethylene (160) polyoxypropylene (30) glycol, sodium polystyrene sulfonate, polysorbate 80, polyvinylacetal diethylamino acetate, polyvinylpyrrolidone, polyethylene glycol, maltitol, maltose, D-mannitol, water candy, isopropyl myristate, anhydrous lactose, anhydrous calcium hydrogenphosphate, anhydrous calcium phosphate granulated substance, magnesium aluminometasilicate, methyl cellulose, cottonseed powder, cotton oil, sargasso low, aluminum monostearate, glyceryl monostearate, sorbitan monostearate, medicinal carbon, peanut oil, aluminum sulfate, calcium sulfate, granular corn starch, adepsine oil, dl-malic acid, calcium monohydrogen phosphate, calcium hydrogenphosphate, calcium hydrogenphosphate granulated substance, sodium hydrogenphosphate, potassium dihydrogen phosphate, calcium dihydrogen phosphate, sodium dihydrogenphosphate, and other ones classified as excipient in "Iyakuhin Tenkabutsu Jiten" (Encyclopedia of Pharmaceutical Additives) (published by YAKUJI NIPPO LIMITED.), and one selected from the above can be optionally used singly or two or more of them can be used in combination.

Examples of disintegrator include croscarmellose sodium, carmellose, carmellose calcium, carmellose sodium, cellulose such as low substitution degree hydroxypropylcellulose, starch such as sodium carboxymethyl starch, hydroxypropyl starch, rice starch, wheat starch, Indian corn starch, potato starch, partly pregelatinized starch, synthetic polymer such as crospovidone and such as crospovidone copolymer and other ones classified as disintegrator in "Iyakuhin Tenkabutsu Jiten" (Encyclopedia of Pharmaceutical Additives) (published by YAKUJI NIPPO LIMITED.), and one selected from the above can be optionally used singly or two or more of them can be used in combination.

Examples of binder include saccharides such as sucrose, glucose, lactose and fructose, sugar alcohols such as mannitol, xylitol, maltitol, erythritol, sorbitol, water-soluble polysaccharides such as gelatine, pullulan, carrageenan, locust bean gum, agar, glucomannan, xanthan gum, tamarind gum, pectin, sodium alginate, Arabia gum, celluloses such as crystalline cellulose, powdered cellulose, hydroxypropylcellulose and methyl cellulose, starches such as pregelatinized starch and starch paste, synthetic polymers such as polyvinylpyrrolidone, carboxyvinyl polymer and polyvinyl alcohol, inorganic compounds such as calcium hydrogenphosphate, calcium carbonate, synthetic hydrotalcite, magnesium aluminosilicate and other ones classified as binder in "Iyakuhin Tenkabutsu Jiten" (Encyclopedia of Pharmaceutical Additives) (published by YAKUJI NIPPO LIMITED.), and one selected from the above can be optionally used singly or two or more of them can be used in combination.

Examples of fluidizing agent include silicon compounds such as silicon dioxide hydrate, light silicic anhydride and other ones classified as fluidizing agent in "Iyakuhin Tenkabutsu Jiten" (Encyclopedia of Pharmaceutical Additives) (published by YAKUJI NIPPO LIMITED.), and one selected from the above can be optionally used singly or two, or more of them can be used in combination.

Examples of lubricant include magnesium stearate, calcium stearate, stearic acid, sucrose fatty acid ester, talc and other ones classified as lubricant in "Iyakuhin Tenkabutsu Jiten" (Encyclopedia of Pharmaceutical Additives) (published by YAKUJI NIPPO LIMITED.), and one selected from the above can be optionally used singly or two or more of them can be used in combination.

Examples of corrigent agent include glutamic acid, fumaric acid, succinic acid, citric acid, sodium citrate, tartaric acid, malic acid, ascorbic acid, sodium chloride, 1-menthol and other ones classified as corrigent agent in "Iyakuhin Tenkabutsu Jiten" (Encyclopedia of Pharmaceutical Additives) (published by YAKUJI NIPPO LIMITED.), and one selected from the above can be optionally used singly or two or more of them can be used in combination.

Examples of flavor include oils such as orange, vanilla, strawberry, yogurt, menthol, fennel oil, cinnamon bark oil, orange peel oil, peppermint oil and green tea powder, and other ones classified as aromatizing agent and/or flavor in "Iyakuhin Tenkabutsu Jiten" (Encyclopedia of Pharmaceutical Additives) (published by YAKUJI NIPPO LIMITED.), and one selected from the above can be optionally used singly or two or more of them can be used in combination.

Examples of coloring agent include edible dyes such as edible red 3, edible yellow 5 and edible blue 1, and sodium copper chlorophyllin, titanium oxide, riboflavin and other ones classified as coloring agent in "Iyakuhin Tenkabutsu Jiten" (Encyclopedia of Pharmaceutical Additives) (published by YAKUJI NIPPO LIMITED.), and one selected from the above can be optionally used singly or two or more of them can be used in combination.

Examples of sweetening agent include aspartame, saccharin, dipotassium glycyrrhizinate, stevia, maltose, maltitol, starch syrup, and Gynostemma powder and other ones classified as sweetening agent in "Iyakuhin Tenkabutsu Jiten" (Encyclopedia of Pharmaceutical Additives) (published by YAKUJI NIPPO LIMITED.), and one selected from the above can be optionally used singly or two or more of them can be used in combination.

Hereinbelow, production processes of tablet pharmaceuticals comprising one or more active ingredients as main ingredients and a porous cellulose aggregate of the present invention are described. But those are examples. The effects of the present invention are not limited to those of the following processes. A process can be adopted in which active ingredients and a porous cellulose aggregate of the present invention are mixed and then compressed to be shaped. On this occasion, the other additives besides the active ingredients may be blended, if necessary and, for example, as another additive, one or more kinds selected from an excipient, a disintegrator, a binder, fluidizing agent, a lubricant, a corrigent, a flavor, a coloring agent, a sweetening agent, and a solubilizing agent shown above may be blended.

There is no particular limitation on the order of adding each ingredient, and either of i) a process of mixing an active ingredient and a porous cellulose aggregate of the present invention and other additives, if necessary, at a time and subjecting them to compression shaping, ii) a process of pretreatment mixing of an active ingredient and a fluidizing agent and/or a lubricant, and mixing them with porous cellulose aggregate of the present invention and other additives, if necessary, and then subjecting them to compression shaping will be adopted. A lubricant may be added to the mixture for compression shaping obtained by i) or ii) and they may be further mixed and then compressed to be shaped.

When a poorly water-soluble active ingredient is particularly used, the following production processes can be adopted. For a production process, for example, either of the following can be adopted.

i) A process wherein the active ingredient is pulverized or just used as it is and mixed with a porous cellulose aggregate of the present invention and other ingredient, if necessary and compressed to be shaped, ii) A process wherein the active ingredient is dissolved or dispersed in water and/or an organic solvent and/or a dissolution aid, adsorbed to the porous cellulose aggregate used in the present invention and/or other additives, if necessary, mixed with the porous cellulose aggregate used in the present invention and/or other additives, if necessary, water and/or the organic solvent is distilled off, if necessary, and compressed to be shaped.

In the process i), it is preferable in the point of compactability and flowability that after the active ingredient is mixed as a pretreatment with additives such as fluidizing agent, the mixture is mixed with the porous cellulose aggregate of the present invention and other ingredients, if necessary and compressed to be shaped.

The crystal form of the active ingredient before compression shaping may be the same as or may be different from the state before preparation, but they are preferably the same from the prospective of stability. When a poorly water-soluble active ingredient is used, it is effective to use a water-soluble polymer or a surfactant together in particular as a solubilizing agent and disperse the ingredient to the medium. The other additives as used herein are additives other than the porous cellulose aggregate of the present invention, and they are additives such as an excipient, a disintegrator, a binder, a fluidizing agent, a lubricant, a corrigent, a flavor, a coloring agent, a sweetening agent, a solubilizing agent, for example, as shown above. These additives may be used singly or two or more of them may be used in combination. Particularly in the case of process ii), there is an effect of improving dissolution of the active ingredient since the process goes through a step of once dissolving or dispersing the poorly water-soluble or water-insoluble active ingredient. Especially when a liquid dispersing medium such as polyethylene glycol is used together as a dispersing medium for a pharmaceutically active ingredient, even if the original active ingredient is a crystal powder, the dispersing medium in which the active ingredient is dispersed becomes liquid or semisolid, and therefore, it cannot be made into tablets unless it is excellent in compression compactability and flowability like the porous cellulose aggregate of the present invention. In addition, it is said that when polyethylene glycol and the like is used as a dispersing medium for a pharmaceutically active ingredient, the active ingredient is absorbed in the body while taking a structure that it is coated with polyethylene glycol in the blood, and an effect to continue the efficacy of the active ingredient which is easy to be metabolized in the liver is also expected.

The method of adding each ingredient is not particularly limited as far as it is usually performed and the ingredients may be continually added or added at a time using a small size suction transport apparatus, an air transport apparatus, a bucket conveyor, a pneumatic transport apparatus, a vacuum conveyer, a vibration type quantitative metering feeder, a spray, a funnel and the like. When the active ingredient is a solution, suspension or emulsion, a method of spraying it on the porous cellulose aggregate or other additives is preferably adopted because the variation of concentration in the final product decreases. The method of spraying may be either one of methods of spraying the active ingredient solution/dispersion with a pressure nozzle, two-fluid nozzle, four-fluid nozzle, a turning disc, supersonic wave nozzles and the like or a method of dripping the active ingredient solution/dispersion from a tubelike nozzle. When the active ingredient solution/dispersion is added, layering or coating may be formed on the surface of the porous cellulose aggregate particle so that the active ingredient may be laminated thereon, or the active ingredient may be carried within the porous cellulose aggregate particle, or the porous cellulose aggregate particles or a mixture of the porous cellulose aggregate particle and the other additive may be granulated in the shape of a matrix using the active ingredient solution/dispersion as a connecting liquid. The layering and coating may be formed by a wet process or a dry process.

The mixing method is not particularly limited as far as it is usually performed and container rotation type mixers such as a V-type, a W-type, a double cone type and a container tack type mixer or agitation type mixers such as high speed agitation type, an almighty agitation type, a ribbon type, a pug type, a Nauta-type mixer, a high speed fluid type mixer, a drum type mixer, a fluidized bed type mixer may be used. In addition, container concussion-type mixers such as a shaker can be used.

The compression shaping method is not particularly limited as far as it is usually performed and a method using a mortar and a mallet to perform compression shaping in a desired shape, a method of compression shaping in a sheet beforehand and then cutting in a desired shape may be used. As the compression shaping machine, for example, roller type press machines such as a static pressure press machine, a briquetting roller type press machine, a smooth roller type press machine, compressors such as a single punch tablet machine and a rotary tablet machine can be used.

The method of dissolving or dispersing the active ingredient in a medium is not particularly limited as far as it is a usually performed dissolving or dispersing method and agitation mixing methods using agitation blade such as one-direction rotation type, multi-axis rotation type, reciprocal inversion type, vertical movement type, rotation+ vertical movement type, piping type such as a portable mixer, a three-dimensional mixer, a side-wall mixer, jet type agitation mixing method such as a line mixer, gas blowing type agitation mixing method, mixing methods using a high shear homogenizer, high pressure homogenizer, a supersonic wave homogenizer, and a container concussion-type mixing methods such as a shaker may be used.

The solvent to be used in the above production method is not particularly limited as far as it is usually used for pharmaceutical product and, for example, water and/or organic solvent can be used. Examples thereof include alcohols such as methanol, ethanol, isopropyl alcohol, butyl alcohol, 2-methylbutyl alcohol, benzyl alcohol, hydrocarbons such as pentane, hexane, heptane, cyclohexane, ketones such as acetone, ethyl methyl ketone, and other ones classified as a solvent in "Iyakuhin Tenkabutsu Jiten" (Encyclopedia of Pharmaceutical Additives) (published by YAKUJI NIPPO LIMITED.), and either one of them may be used alone and two or more of them may be used in combination, or after the ingredient is dispersed in one kind of medium, the medium may be removed and then the ingredient may be dispersed in another medium.

Examples of the water-soluble polymer as a solubilizing agent include hydroxypropylcellulose, hydroxypropyl methylcellulose, polyacrylic acid, a carboxyvinyl polymer, polyethylene glycol, polyvinyl alcohol, polyvinylpyrrolidone, methyl cellulose, ethyl cellulose, Arabian gum, starch paste, and other water-soluble polymer described in "Iyakuhin Tenkabutsu Jiten" (Encyclopedia of Pharmaceutical Additives) (published by YAKUJI NIPPO LIMITED.), and either one of them may be used alone and two or more of them may be optionally used in combination.

Examples of the oils and fats as a solubilizing agent include stearic acid monoglyceride, stearic acid triglyceride, stearic acid sucrose ester, paraffin such as adepsine oil, carnauba wax, hardening oils such as hydrogenated castor oil, castor oil, stearic acid, stearyl alcohol, polyethylene glycol and other oils and fats described in "Iyakuhin Tenkabutsu Jiten" (Encyclopedia of Pharmaceutical Additives) (published by YAKUJI NIPPO LIMITED.), and either one of them may be used alone and two or more of them may be optionally used in combination.

Examples of surfactant as a solubilizing agent include phospholipids, fatty acid ester of glycerin, polyethylene glycol fatty acid ester, sorbitan fatty acid ester, polyoxyethylene hydrogenated castor oil, polyoxyethylene cetyl ether, polyoxyethylene stearyl ether, polyoxyethylene nonyl phenyl ether, polyoxyethylene polyoxypropylene glycol, polyoxyethylene sorbitan monolaurate, polysorbate, sorbitan monooleate, monostearin acid glyceride, monooxyethylene sorbitan monopalmitate, monooxyethylene sorbitan monostearate, polyoxyethylene sorbitan monooleate, sorbitan monopalmitate, sodium lauryl sulfate, etc., which are classified as surfactant in "Iyakuhin Tenkabutsu Jiten" (Encyclopedia of Pharmaceutical Additives) (published by YAKUJI NIPPO LIMITED.) and they can be optionally used singly or two or more kinds can be used in combination.

The tablet as used in the present invention refers to a molded product which contains the porous cellulose aggregate of the present invention and one or more active ingredient and other additives if necessary and can be obtained by compression shaping. The composition for tablets in which the porous cellulose aggregate of the present invention is blended particularly provides practical hardness without passing through complicated process by a simple and easy method such as a direct punching method, but if necessary, either of the production processes such as dry granulated powder compression method, wet granulated powder compression method, post powdering method, and production processes for multi-core tablet containing preliminarily compressed and shaped tablets as inner cores, or multilayer tablet in which plural molded products preliminarily compressed are stacked and compressed again.

The porous cellulose aggregate of the present invention is excellent in various characteristics demanded for an excipient such as compression compactability, self compactability, disintegration and therefore it is particularly effective for tablets which contain many kinds of pharmaceutical agents in a large amount and are hard to exhibit tablet hardness and easy to produce troubles in tableting such as defect on the tablet surface, chip, detachment from the inside, crack, for example, over-the-counter drugs, tablets in which extract powder such as traditional Chinese medicine are blended, small tablets, noncircular deformed tablets having points where compression pressure is hard to impose uniformly such as constrictions of the edge, tablets containing pharmacological agents which it is easy to deactivate by punching pressure or friction with excipients such as an enzyme/protein containing tablets, tablets containing coated granules. In addition, the cellulose powder of the present invention is excellent in compression compactability and disintegration properties, and therefore it provides tablets which show practical abrasion degree by comparatively low compression pressure. Accordingly, it can hold a cavity (aqueduct) within a tablet and is effective for application in disintegration tablet in oral cavity which is to be quickly disintegrated in the oral cavity. Furthermore, as for multilayer tablets in which several kinds of ingredients are molded by compression at one step or plural steps and multicore tablets, there is provided an effect of preventing detachment between the layers and cracks as well as imparting hardness as mentioned above and controlling common obstacles in tableting. The porous cellulose aggregate of the present invention has a secondary aggregate structure formed by aggregation of primary particles, and therefore, it is excellent in division characteristics of the particle in itself and allows a tablet to be divided uniformly when used for a scored tablet. Furthermore, the porous cellulose aggregate of the present invention has a developed multicellular structure, and the cellulose particle in itself is excellent in the properties of holding a pharmacological agent in the form of finely divided particles, a pharmacological agent in the form of a suspension, an ingredient in the form of a solution, and accordingly, tablets using it is also excellent in the properties of holding ingredients in the form of suspension and solution. Therefore, it is effective for use in layering an ingredient in the form of solid, suspension or solution on tablets, for use in coated tablets, and further for layering of sugar-coated tablets and the like in which ingredients such as sugar and calcium carbonate in the form of a suspension are laminated on the surface of the tablets, and for preventing the detachment of and reinforcing the coating layer and sugarcoating layer.

Next is described the usage of a composition containing one or more active ingredients and a porous cellulose aggregate particle. The solid, liquid or semisolid active ingredient and the porous cellulose aggregate particle composition obtained by the method described above may be used as a solid preparation in the form of powder or granule, or as a coated powder or a granular solid preparation in which the powder or granule composition is further coated with a coating agent. The granular composition obtained here with/without coating may be filled in a capsule or may be compressed and shaped and used as a tablet type solid preparation. Furthermore, the capsule or tablet may be coated and used.

Examples of the coating agent for performing coating include ethyl acrylate methyl methacrylate co-polymer dispersion, acetyl fatty acid ester of glycerin, amino alkyl methacrylate copolymer, powdered acacia, ethyl cellulose, ethyl cellulose aqueous dispersion, octyl decyl triglyceride, Olive oil, porcelain clay, cacao butter, Prunella Spike, caster wax, caramel, carnauba wax, carboxyvinyl polymer, carboxymethyl ethyl cellulose, sodium carboxymethyl starch, carmellose calcium, carmellose sodium, silicon dioxide hydrate, dried aluminum hydroxide gel, dried lactescence bleached lac, dried methacrylic acid copolymer, glutinous rice powder, fish scale powder, gold leaf, silver foil, triethyl citrate, glycerin, fatty acid ester of glycerin, magnesium silicate, light silicic anhydride, light silicic anhydride containing hydroxypropylcellulose, light liquid paraffin, whale wax, crystalline cellulose, hardened oil, synthetic aluminum silicate, synthetic wax, high glucose starch syrup, hard wax, amber gelatin, wheat flour, wheat starch, rice starch, cellulose acetate, vinyl acetate resin, cellulose acetate phthalate, white beeswax, titanium oxide, magnesium oxide, dimethylaminoethyl meta acrylate methyl methacrylate copolymer, dimethylpolysiloxane, dimethylpolysiloxane/silicon dioxide mixture, silicon oxide mixture, plaster, sucrose fatty acid ester, agalloch powder, aluminum hydroxide gel, hydrogenated rosin glycerin ester, stearyl alcohol, stearic acid, aluminum stearate, calcium stearate, polyoxyl stearate, magnesium stearate, purified gelatine, purified shellac, purified sucrose, zein, sorbitan sesquioleate, cetanol, plaster, gelatine, shellac, sorbitan fatty acid ester, D-sorbitol, D-sorbitol liquid, tricalcium phosphate, talc, calcium carbonate, magnesium carbonate, single syrup, middle gold leaf, precipitated calcium carbonate, low substitution degree hydroxypropylcellulose, terpene resin, starch (soluble), Indian corn syrup, corn oil, triacetin, calcium lactate, white shellac, sucrose, honey, hard fat, paraffin, pearl powder, potato starch, hydroxypropylcellulose, hydroxypropylcellulose, hydroxypropylcellulose acetate succinate, hydroxypropylcellulose/titanium oxide polyethylene glycol mixture, hydroxypropyl methylcellulose phthalate, piperonyl butoxide, castor oil, diethyl phthalate, dibutyl phthalate, butyl phthalyl butyl glycolate, glucose, partially pregelatinized starch, fumaric acid/stearic acid/polyvinylacetal diethylamino acetate/hydroxypropylcellulose mixture, pullulan, propylene glycol, powdered sugar, bentonite, popidon, polyoxyethylene hydrogenated castor oil, polyoxyethylene (105) poly oxypropylene (5) glycol, polyoxyethylene (160) poly oxypropylene (30) glycol, polyoxyethylene sorbitan monostearate, polyvinylacetal diethylamino acetate, polyvinyl alcohol (partially saponified), polyethylene glycol, terminal hydroxyl group substituted methyl polysiloxane silicone resin copolymer, D-mannitol, starch syrup, beeswax, myristyl alcohol, silicic anhydride hydrate, phthalic anhydride, anhydrous calcium hydrogenphosphate, methacrylic acid copolymer, magnesium aluminometasilicate, methyl cellulose, 2-methyl-5-vinylpyridine methylacrylate methacrylic acid copolymer, vegetable wax, glyceryl monostearate, sorbitan monostearate, sorbitan monolaurate, montanic acid ester wax, medicinal carbon, laumacrogol, calcium sulfate, liquid cumarone resin, liquid paraffin, dl-malic acid, calcium monohydrogen phosphate, calcium hydrogenphosphate, sodium hydrogenphosphate, calcium dihydrogen phosphate, rosin, and other coating agents described in "Iyakuhin Tenkabutsu Jiten" (Encyclopedia of Pharmaceutical Additives) (published by YAKUJI NIPPO LIMITED.) and they can be optionally used singly or two or more kinds can be used in combination.

The porous cellulose aggregate of the present invention has a developed multicellular structure and the particle in itself is excellent in holding a pharmacological agent, and therefore, the particles can be directly used as fine particles having a pharmacological agent supported within the pores or they can be used as granules granulated from them, or they can be compressed and shaped. These fine particles, granules and tablets may be further subjected to coating. The method of supporting is not particularly limited as far as it is a known method, and either of the following processes, which can be optionally used singly or two or more kinds can be used in combination, can be adopted.

i) A process for having a finely divided agent supported within pores by mixing the aggregate (particles) with the finely divided pharmacological agent.

ii) A process for forcibly making a powdered pharmacological agent within pores by mixing the aggregate (particles) with the powdered pharmacological agent under high shearing.

iii) A process for having a pharmacological agent supported within pores by mixing the aggregate (particles) with the pharmacological agent that has been made into a solution or a dispersion, optionally followed by drying.

iv) A process for having a sublimable pharmacological agent supported pores by sublimation and absorption by mixing the aggregate (particles) with the sublimable pharmacological agent followed by heating and/or reducing pressure.

v) A process for having a pharmacological agent supported within pores by mixing the aggregate with the pharmacological agent before heating or during heating followed by melting the pharmacological agent by heating.

The porous cellulose aggregate of the present invention has a developed pore structure and has water retention properties and oil retention properties to a moderate degree, and therefore, it can be used as core particles for layering and/or coating besides the application as an excipient and in such an application, it is effective for restraining aggregation among particles in the layering and/or coating steps. The layering and/or coating may be a dry process or may be a wet process.

In addition, when the active ingredient is a solution, suspension or emulsion, a method can be taken in which the carrier is immersed in a solution, suspension or emulsion of the active ingredient to have the active ingredient retained such as dipping method using a porous cellulose aggregate particle or a mixture of a porous cellulose aggregate particle and other additives as a carrier. Although it depends on conditions such as species and concentration of the active ingredient, but homogeneity of the active ingredient is practically retained even by such dipping and, in addition, this method is excellent in that the process is simple as compared with the above spraying method.

Furthermore, when the active ingredient is a solution, suspension or emulsion, another method can be also taken in which a porous cellulose aggregate particle or a mixture of a porous cellulose aggregate particle and other additives as a carrier used as a carrier is immersed in a solution, suspension or emulsion of the active ingredient and the dispersion is spray dried to form into a complex material.

The porous cellulose aggregate particle or a mixture of the porous cellulose aggregate particle and other additives before and after an active ingredient solution/dispersion is added may be a state wherein the constituent particles disperse independently or may be aggregated to form granules.

The granulating method when the production process goes through granulation include dry process granulation, wet process granulation, heat process granulation, spraying granulation and microencapsulation. As wet process granulation, fluidized bed granulation method, agitation granulation method, extruding granulation method, pulverizing granulation method, rolling granulation method are effective and, the fluidized bed granulation method comprises spraying a binder liquid on the fluidized powder and thereby performing granulation. In the agitation granulation method, the agitation blade is rotated in the mixing tank while adding a binder liquid and thereby effecting mixing, kneading and granulation at the same time in a closed structure. In the extruding granulation method, a wet cake kneaded with the addition of a binder liquid is forced to go through a screen of a suitable size by methods with a screw or a basket or the like to effect granulation. In the pulverizing method, a wet cake kneaded with the addition of a binder liquid is sheared and pulverized using a rotating blade of a granulating machine and spun off from the circumference of the screen of by the centrifugal force and thereby effecting granulation. In the rolling granulation method, the materials are rolled by the centrifugal force on the rotating rotor and made to grow to spherical granules having a uniform particle size like a snowball with a binder liquid sprayed from a spraying gun on this occasion.

As the method for drying granules, any of the processes such as hot air heating type (shelf drying, vacuum drying, fluidized bed drying), heat conduction wall (pan type, shelf box type, drum type) and lyophilization can be used. In the hot air heating type, materials are directly contacted with hot air and evaporated moisture is removed at the same time. In the heat conduction type, materials are indirectly heated through a heat conducting wall. In the lyophilization, materials are preliminarily frozen at −10 to 40° C. and then warmed under high vacuum of $1.3\times10^{-5}$~$2.6\times10^{-4}$ MPa) to sublimate and remove moisture.

For example, i) a mixture of an active ingredient and a porous cellulose aggregate particle or a mixture of one or more active ingredients and a porous cellulose aggregate particle and other additives if necessary is compressed and shaped by a normal method (direct punching method). Alternatively, ii) an active ingredient and a porous cellulose aggregate particle and other additives if necessary may be mixed and granulated into granules and then compressed and shaped by a normal method (wet process/dry process granulated powder compression method). Furthermore, iii) an active ingredient and a porous cellulose aggregate particle and other additives if necessary may be mixed and granulated into granules and further mixed with a porous cellulose aggregate particle and other additives if necessary and then compressed and shaped by a normal method (wet process/dry process uncompress after granulation method).

The method of adding one or more active ingredients, a porous cellulose aggregate particle and other additives or granules is not particularly limited as far as it is a usually used method and the ingredients may be continually added or added at a time using a small size suction transport apparatus, an air transport apparatus, a bucket conveyor, a pneumatic transport apparatus, a vacuum conveyer, a vibration type quantitative metering feeder, a spray, a funnel and the like.

As mentioned above, the composition for tablets of the present invention is excellent in properties of holding a solid and a liquid ingredient, and therefore in particular, it may be used as granules and powders for the purpose of improving flowability, blocking resistance, anti-aggregation characteristics. As the production process for producing granules and powders, for example, any of dry process granulation, wet process granulation, heat granulation, spray drying and microencapsulation may be used.

The present invention is described by means of Examples. However, embodiments of the present invention are not limited to those described in these Examples. The measuring method of each physical properties in Examples and Comparative Examples are as follows.

(1) Average Particle Size of Cellulose Dispersion Particle (μm)

A sample dispersed in water was measured with laser diffraction type particle size distribution meter (manufactured by Horiba, Ltd., trade name, LA-910) without ultrasonication treatment and with refraction index 1.20, and expressed as the particle size at which accumulated volume reached 50%. Note that the measured value by this apparatus is completely different from the dry particle size distribution obtained by the following low taps type apparatus in the measuring principle and therefore they do not necessarily correlate to each other. A cellulose dispersion particle usually takes an extended fibrous shape, and the average particle size measured by laser diffraction assumes that the fibrous particle is a sphere having a diameter of 80% of the longer axis and is determined by the volume frequency against this diameter. In contrast, the average particle size obtained by low tap type method is that measured for the weight frequency against the particle size by shaking the obtained powder on a screen and fractionated, and, here, fractionation of particles are made by the minor axis of the fiber. Accordingly, the value by laser diffraction depending on the length of a particle of fiber is generally larger than the value by low tap measurement depending on the minor axis of the fiber.

(2) Crystal Form

X-ray diffraction was performed by X-ray diffractometer and the crystal form was determined from the X-ray pattern.

(3) Average Particle Size of Dry Particle (μm)

The average particle size of a powder sample was determined by sieving 10 g of sample for 10 minutes using a low tap sieve shaking machine (manufactured by Taira Kosakusho, Ltd., trade name, sieve shaker A type) with a JIS standard sieve (Z8801-1987) and expressed as the particle size at which accumulated volume reached 50%.

(4) Specific Surface Area ($m^2/g$))

The specific surface area was measured with TriSTAR (trade name, product of Micromeritics Instrument Corporation) by BET method using nitrogen as adsorption gas. About 1 g each of sample powder was put in a cell and measured. Each sample powder used for measurement was dried at 110° C. under reduced pressure for 3 hours and used.

(5) Pore Volume within a Particle ($cm^3/g$), Central Pore Diameter (μm)

The pore distribution was determined with Autopore 9520 (trade name, product of Shimadzu Corporation) by mercury porosimetry. Each sample powder used for measurement was dried at room temperature under reduced pressure for 15 hours and used. A "clear peak part" in a range of pore diameter of 0.1-10 μm was calculated as pore volume within a particle from pore distribution obtained by the measurement of initial pressure of 20 kPa. In addition, the peak top of the "clear peak" observed in a range of pore diameter of 0.1-10 μm from the obtained pore distribution was assumed as the center pore diameter and the value was read.

(6) Apparent Specific Volume ($cm^3/g$)

A 100 $cm^3$ graduated measuring cylinder was used and roughly filled with a powder sample using a metering feeder for two to three minutes, the top surface of the powder layer was leveled with a soft brush like a writing brush, and the volume was read, which was divided by the weight of the powder sample. The weight of the powder was appropriately adjusted so that the volume might be 70-100 $cm^3$.

(7) Observation of Particle Surface and Pores with SEM

Each cellulose sample was placed on the sample table attached with a carbon tape, and vacuum deposited with platinum palladium (film thickness of the deposited film of this case: 20 nm or less) and observed with JSM-5510LV (trade name, product of JASCO Corp.) at acceleration voltage of 6 kV and 250- and 1500-fold magnification, and the samples having an aggregate structure of secondary particles in which primary particles continuously aggregated and the border of primary particles was clear, and primary particles having a central pore diameter of observable pores of 0.1 μm or more aggregated were judged as good ○ while those having the other structures are judged as x.

(8) Disintegration of Cellulose Particles in Water 0.1 g of each cellulose sample was introduced into a glass test tube, and 10 g of pure water was further added, and after treatment by supersonic wave was performed for one minute, the samples were observed with a microscope (manufactured by Keyence, trade name, VH-7000) in presence or absence of ultrasonication and disintegration of the particles was observed. Samples in which disintegration was observed were judged as good ○ while those not observed as x.

(9) Reactivity with Pharmacological Agent

Aspirin (official crystal aspirin one pass treated with a small pulverizer ϕ 0.5 mm) and each cellulose sample were blended by powder-powder in 5/5 (total amount: 0.5 g) in dry process and mixed in glass sample bottle and stored with airtight stopper (60° C.) in an oven (manufactured by Tabai Espec, trade name, perfect oven) for two weeks and decomposition ratio was measured. 8 g of ferric sulfate (III) sodium 12-hydrate was introduced into a 100 mL measuring flask and pure water was added to make the total 100 mL and used as a color identification test liquid. 0.25 g of aspirin after stored (0.5 g for powder blend product) was introduced into a 50 mL measuring flask and added with ethanol to total 50 mL and shaken for five minutes. The resulted ethanol solution was filtered and the filtrate was transferred to a 100 mL measuring flask and added with ethanol to total 100 mL. 1 mL of this ethanol solution and 1 mL of the above color identification test liquid were introduced into a 50 mL measuring flask and added with pure water to total 50 mL and absorbance at wavelength 532 nm was measured with an ultraviolet absorbance measuring instrument (manufactured by JASCO Corp.). The decomposition ratio was calculated as follows:

$$\text{Decomposition ratio} = (1-(\text{absorbance after stored}/\text{absorbance before stored})) \times 100 (\%).$$

Those exhibiting decomposition ratio more than 15%, which is the decomposition ratio of aspirin alone, were judged as reactive.

(10) Repose Angle (°)

Self-flowability when a cellulose powder was dropped on a slit at a rate of 3 g/min by a metering feeder was measured with a Sugihara-type repose angle measuring instrument (slit size depth 10×width 50×height 140 mm; a protractor was set at a position of 50 mm in width).

(11) Compression Shaping of Cellulose Sample Alone 0.5 g each of cellulose powder was weighed, put in a mortar (manufactured by Kikusui Seisakusho, Ltd. using materials SUS2, 3) and compressed with a round plane mallet (manufactured by Kikusui Seisakusho, Ltd. using materials SUS2, 3) of a diameter of 1.1 cm till the pressure reached 10 MPa, 20 Mpa (manufactured by Aikoh Engineering, trade name, PCM-1A, compression rate 1 cm/min) and after held at the aimed pressure for 10 seconds, a columnar molded product was taken out.

(12) Rotary Punching of Formulated Powder 55 parts of acetaminophen (manufactured by API Co., Ltd., powder type), 0.25 part by weight of light silicic anhydride (manufactured by NIPPON AEROSIL CO., LTD., trade name, AEROSIL 200), 27 parts by weight of cellulose particle or powder obtained in Examples and Comparative Examples, 2 parts by weight of crospovidone (manufactured by BASF, trade name, Kollidon CL) and 15 parts by weight of granulated lactose (manufactured by Lactose New Zealand, trade name, Super-Tab) were put into a 100 L scale V-type mixer (manufactured by Dalton Corp.) and mixed for 30 minutes and subsequently added with 0.5 part by weight of magnesium stearate (manufactured by Taihei Chemical Industrial, Co., Ltd., vegetable origin), mixed further for 5 minutes and a formulated powder was obtained. Here the total amount of each powder was 25 kg. The obtained formulated powder was supplied to a rotary tablet machine (Kikusui Seisakusho, Ltd., trade name, LIBRA-II, rotating plate ϕ 410 mm for 36 mallets) with an agitation feeder. Punched with mallets having a diameter of 8 mm, 12R, under the turning table rotation of 50 rpm, compressive force 7.5 kN, 200 mg in weight of tablets were obtained.

(13) Variation in the Mass of Tablets (%)

The weight of 20 tablets obtained by rotary punching was measured, and the average weight and standard deviation of weight were calculated and variation in the mass was evaluated from variation index (%) defined by (standard deviation/average weight)×100. The smaller the variation index is, the smaller the variation is.

(14) Hardness of Tablet (N)

Load was applied to columnar molded products or tablets using a Schleuniger hardness gauge (manufactured by Freund Industrial, Co., Ltd., trade name, 6D type) in the diameter direction of the columnar molded products or tablets and destroyed and the load at that time was measured. Hardness (N) was represented by the average of 10 samples.

(15) Disintegration Time (Second)

Disintegration test was performed following the general test method and disintegration test method of tablets in the 14th revision of Japanese pharmacopeia. Disintegration time was determined for columnar molded products or tablets at 37° C. in pure water with a disintegration test container (manufactured by Toyama Industry Co., Ltd., trade name, NT-40HS type, with a disc). Disintegration time was represented by the average of 6 samples.

(16) Abrasion Degree of Tablet (wt %)

The weight (Wa) of 20 tablets was measured and they were put in an abrasion degree test machine (manufactured by Japan Machinery Co., Ltd., trade name, PTF-3RA type) and after turned at 25 rpm for 4 minutes, fine powders stuck to the tablets were removed and the weight (Wb) was measured again and the abrasion degree was calculated from the following formula.

Abrasion degree=100×(Wa−Wb)/Wa

(17) Incidence of Troubles in Tableting (%)

100 tablets obtained by the rotary tablet machine were selected at random and visually observed, and the number of crack (lamination), chipping and detachment (capping) was counted and they were shown as a value divided by the total number of the tablets observed (percentage).

Example 1

2 kg of finely chipped commercial pulp (dissolving pulp of natural cellulose derived from wood) and 30 L of 4N hydrochloric acid aqueous solution were put in a low-speed stirrer (manufactured by Ikebukuro Horo Kogyo Co., Ltd., trade name, 30LGL reactor) and hydrolyzed under stirring at 40° C. for 48 hours and acid insoluble residue was obtained. The obtained acid insoluble residue was sufficiently washed with pure water and then filtered to obtain wet flock (the average particle size of cellulose dispersion particle of this acid insoluble residue were 55 μm). 50 wt % of the obtained wet flock was further washed sufficiently with pure water, neutralized, filtered again and air dried and flock-like dried substance was obtained. This flock-like dried substance was broken into flakes with a household mixer and then further pulverized with an air stream type pulverizer (manufactured by SEISHIN ENTERPRISE Co., Ltd., trade name, Single Track Jet Mill STJ-200) and pulverized material was obtained (particle size of cellulose at this time was 5 μm). The obtained pulverized material and the above-described acid insoluble residue in a wet state in a composition of 50 wt % and 50 wt % (dry base) were introduced into a 90 L polyethylene bucket, added with pure water so that the concentration of the all solid contents was 25 wt %, neutralized with ammonia water (the pH after neutralization was 7.5-8.0) while stirring with a 3-1 motor and spray dried (dispersion feeding rate: 6 kg/hr, entrance temperature: 180-220° C., exit temperature: 50-70° C.) to obtain Cellulose Aggregate A. Various physical properties of Cellulose Particles A are shown in Table 1.

As a result of measuring pore distribution of Cellulose Particles A by mercury porosimetry (FIG. 1), a "clear peak" coming from pores within a particle was confirmed in 0.1-10 μm. Another peak shown in 10-50 μm in FIG. 1 comes from spaces among particles.

Figure 3:
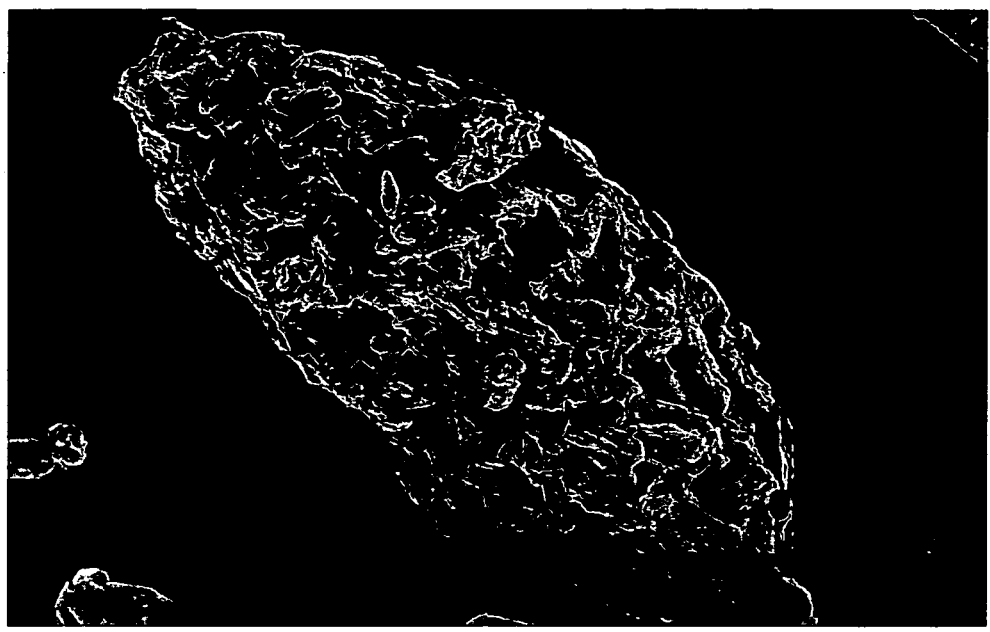
FIG. 3 is an electron microgram of the porous cellulose aggregate A (Example 1) of the present invention in 250-fold magnification. A "secondary aggregate structure formed by aggregation of primary particles" was observed.
Figure 5:
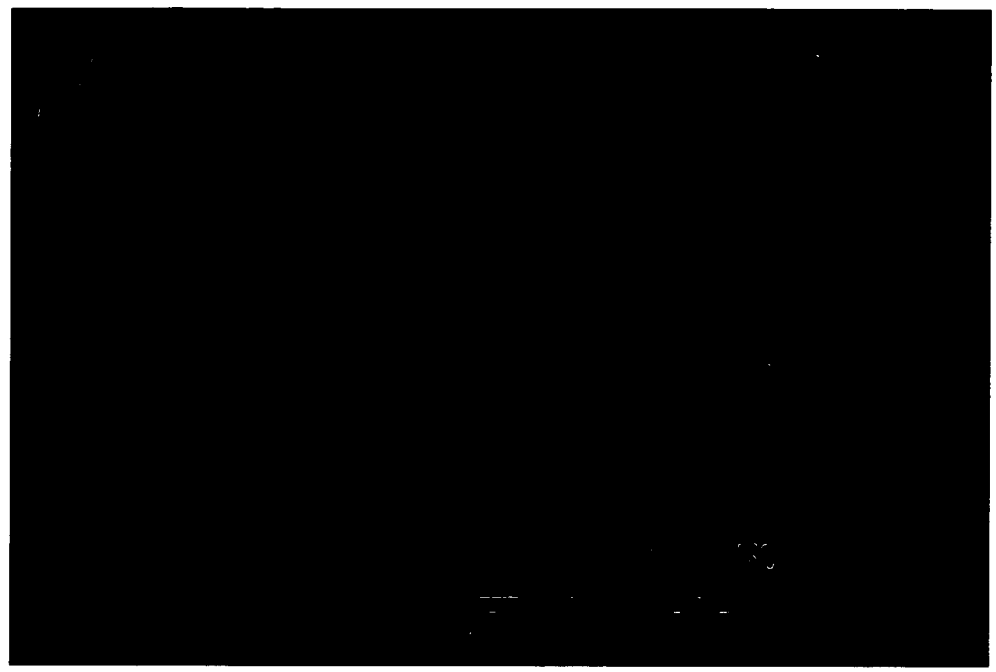
FIG. 5 is an electron microgram of the cellulose powder P (Comparative Example 8) in 250-fold magnification. It can be seen from the photograph that the particle structure of cellulose powder P is a "secondary aggregate structure formed by aggregation of primary particles" but since it was prepared by drying a dispersion of cellulose particles having a single average particle size, pore volume within a particle was small, and as a result of measuring pore distribution by mercury porosimetry, "a clear peak" in 0.1-10 µm in pore distribution was not confirmed.

In addition, as a result of observing Cellulose Aggregate A by scanning electron microscope (SEM) at 250- and 1500-fold magnification (FIGS. 3 and 5), the "secondary aggregate structure formed by aggregation of primary particles" was observed (FIG. 3) and primary particle particles was able to be distinguished definitely (FIG. 5).

Disintegration of particles was also observed in the water.

Example 2

Acid insoluble residue obtained in the same manner as in Example 1 was sufficiently washed with pure water and then filtered to obtain wet flock. 60 wt % of the obtained wet flock was further washed sufficiently with pure water, neutralized, filtered again and air dried and flock-like dried substance was obtained. This flock-like dried substance was broken into flakes with a household mixer and then further pulverized with an air stream type pulverizer (manufactured by SEISHIN ENTERPRISE Co., Ltd., trade name, Single Track Jet Mill STJ-200) and pulverized material was obtained (particle size of cellulose at this time was 3 μm). The obtained pulverized material and the above-described acid insoluble residue in a wet state in a composition of 60 wt % and 40 wt % (dry base) were introduced into a 90 L polyethylene bucket, added with pure water so that the concentration of the all solid contents was 10 wt %, neutralized with ammonia water (the pH after neutralization was 7.5-8.0) while stirring with a 3-1 motor and spray dried in the same manner as in Example 1 and Cellulose Particles B were obtained. Various physical properties of Cellulose Particles B are shown in Table 1.

As a result of pore distribution measurement by mercury porosimetry and scanning electron microscope (SEM) observation in the same manner as for Cellulose Aggregate A, a "clear peak" was confirmed in 0.1-10 μm in the pore distribution by mercury porosimetry, and "secondary aggregate structure formed by aggregation of primary particles" was confirmed from SEM picture and boundaries among the primary particles were definite similarly in Cellulose Aggregate A. Disintegration of particles was also observed in the water.

Example 3

Acid insoluble residue obtained in the same manner as in Example 1 was sufficiently washed with pure water and then filtered to obtain wet flock. 40 wt % of the obtained wet flock was further washed sufficiently with pure water, neutralized, filtered again and air dried and flock-like dried substance was obtained. This flock-like dried substance was broken into flakes with a household mixer and then further pulverized with an air stream type pulverizer (manufactured by SEISHIN ENTERPRISE Co., Ltd., trade name, Single Track Jet Mill STJ-200) and pulverized material was obtained (particle size of cellulose at this time was 8 μm). The obtained pulverized material and the above-described acid insoluble residue in a wet state in a composition of 40 wt % and 60 wt % (dry base) were introduced into a 90 L polyethylene bucket, added with pure water so that the concentration of the all solid contents was 27 wt %, neutralized with ammonia water (the pH after neutralization was 7.5-8.0) while stirring with a 3-1 motor and spray dried in the same manner as in Example 1 and Cellulose Aggregate C was obtained. Various physical properties of Cellulose Aggregate C are shown in Table 1.

As a result of pore distribution measurement by mercury porosimetry and scanning electron microscope (SEM) observation in the same manner as for Cellulose Aggregate A, a "clear peak" was confirmed in 0.1-10 μm in the pore distribution by mercury porosimetry, and "secondary aggregate structure formed by aggregation of primary particles" was confirmed from SEM picture and boundaries among the primary particles were definite similarly in Cellulose Aggregate A. Disintegration of particles was also observed in the water.

Example 4

Hydrolyzation was performed in the same manner as in Example 1 except that the hydrolyzation condition was changed to 3N hydrochloric acid aqueous solution at 40° C. for 24 hours and acid insoluble residue (the average particle size of cellulose dispersion particle in the acid insoluble residue were 82 μm) was obtained. The obtained acid insoluble residue was refined by the same operation as in Example 1 to obtain wet flock. 50 wt % of the obtained wet flock was further washed sufficiently with pure water, neutralized, filtered again and air dried and flock-like dried substance was obtained. This flock-like dried substance was broken into flakes with a household mixer and then further pulverized with an air stream type pulverizer (manufactured by SEISHIN ENTERPRISE Co., Ltd., trade name, Single Track Jet Mill STJ-200) and pulverized material was obtained (particle size of cellulose at this time was 5 μm). The obtained pulverized material and the above-described acid insoluble residue in a wet state in a composition of 50 wt % and 50 wt % (dry base) were introduced into a 90 L polyethylene bucket, added with pure water so that the concentration of the all solid contents was 16 wt %, neutralized with ammonia water (the pH after neutralization was 7.5-8.0) while stirring with a 3-1 motor and spray dried in the same manner as in Example 1 and Cellulose Aggregate D was obtained. Various physical properties of Cellulose Aggregate D are shown in Table 1.

As a result of pore distribution measurement by mercury porosimetry and scanning electron microscope (SEM) observation in the same manner as for Cellulose Aggregate A, a "clear peak" was confirmed in 0.1-10 μm in the pore distribution by mercury porosimetry, and "secondary aggregate structure formed by aggregation of primary particles" was confirmed from SEM picture and boundaries among the primary particles were definite similarly in Cellulose Aggregate A. Disintegration of particles was also observed in the water.

Example 5

Acid insoluble residue obtained in the same manner as in Example 1 was refined by the same operation as in Example 1 to obtain wet flock. 10 wt % of the obtained wet flock was further washed sufficiently with pure water, neutralized, filtered again and air dried and flock-like dried substance was obtained. This flock-like dried substance was broken into flakes with a household mixer and then further pulverized with an air stream type pulverizer (manufactured by SEISHIN ENTERPRISE Co., Ltd., trade name, Single Track Jet Mill STJ-200) and pulverized material was obtained (particle size of cellulose at this time was 3 μm). The obtained pulverized material and the above-described acid insoluble residue in a wet state in a composition of 10 wt % and 90 wt % (dry base) were introduced into a 90 L polyethylene bucket, pure water was added so that the concentration of the all solid contents was 35 wt %, neutralized with ammonia water (the pH after neutralization was 7.5-8.0) while stirring with a 3-1 motor and spray dried in the same manner as in Example 1 and Cellulose Aggregate E were obtained. Various physical properties of Cellulose Aggregate E are shown in Table 1.

As a result of pore distribution measurement by mercury porosimetry and scanning electron microscope (SEM) observation in the same manner as for Cellulose Aggregate A, a "clear peak" was confirmed in 0.1-10 μm in the pore distribution by mercury porosimetry, and "secondary aggregate structure formed by aggregation of primary particles" was confirmed from SEM picture and boundaries among the primary particles were definite similarly in Cellulose Aggregate A. Disintegration of particles was also observed in the water.

Example 6

Hydrolyzation was performed in the same manner as in Example 1 except that the hydrolyzation condition was changed to 0.14N hydrochloric acid aqueous solution at 121° C. for 1 hour and acid insoluble residue (the average particle size of cellulose dispersion particle in the acid insoluble residue were 36 μm) was obtained. The obtained acid insoluble residue was refined by the same operation as in Example 1 to obtain wet flock. 50 wt % of the obtained wet flock was further washed sufficiently with pure water, neutralized, filtered again and air dried and flock-like dried substance was obtained. This flock-like dried substance was broken into flakes with a household mixer and then further pulverized with an air stream type pulverizer (manufactured by SEISHIN ENTERPRISE Co., Ltd., trade name, Single Track Jet Mill STJ-200) and pulverized material was obtained (particle size of cellulose at this time was 5 μm). The obtained pulverized material and the above-described acid insoluble residue in a wet state in a composition of 50 wt % and 50 wt % (dry base) were introduced into a 90 L polyethylene bucket, added with pure water so that the concentration of the all solid contents was 30 wt %, neutralized with ammonia water (the pH after neutralization was 7.5-8.0) while stirring with a 3-1 motor and spray dried in the same manner as in Example 1 and Cellulose Aggregate F was obtained. Various physical properties of Cellulose Aggregate F are shown in Table 1.

As a result of pore distribution measurement by mercury porosimetry and scanning electron microscope (SEM) observation in the same manner as for Cellulose Aggregate A, a "clear peak" was confirmed in 0.1-10 μm in the pore distribution by mercury porosimetry, and "secondary aggregate structure formed by aggregation of primary particles" was confirmed from SEM picture and boundaries among the primary particles were definite similarly in Cellulose Aggregate A. Disintegration of particles was also observed in the water.

Example 7

Commercial pulp (natural cellulose kraft pulp derived from cotton linter) was used and hydrolyzed in the same manner as in Example 6 and the obtained acid insoluble residue (the average particle size of cellulose dispersion particle in the acid insoluble residue were 30 μm) was refined by the same operation as in Example 1 to obtain wet flock. 90 wt % of this wet flock was further washed sufficiently with pure water, neutralized and ground with a planetary mixer (particle size of cellulose dispersion particle in the ground wet flock was 1 μm). The ground wet flock and unground wet flock in a composition of 90 parts by weight and 10 parts by weight (dry base) were introduced into a 90 L polyethylene bucket, added with pure water so that the concentration of the all solid contents was 30 wt %, neutralized with ammonia water (the pH after neutralization was 7.5-8.0) while stirring with a 3-1 motor and spray dried in the same manner as in Example 1 and Cellulose Aggregate G was obtained. Various physical properties of Cellulose Aggregate G are shown in Table 1.

As a result of pore distribution measurement by mercury porosimetry and scanning electron microscope (SEM) observation in the same manner as for Cellulose Aggregate A, a "clear peak" was confirmed in 0.1-10 μm in the pore distribution by mercury porosimetry, and "secondary aggregate structure formed by aggregation of primary particles" was confirmed from SEM picture and boundaries among the primary particles were definite similarly in Cellulose Aggregate A. Disintegration of particles was also observed in the water.

Example 8

1 kg of commercial dissolving pulp was finely chipped and broken to flakes in a humid condition of 50% water content with a household mixer for 2 hours and taken out, washed with pure water and filtered to obtain residual substance (average particle size of cellulose dispersion particle at this time was 110 μm). While this residue was dispersed in water, coarse particles are removed by using a screen having a pore size of 500 μm and filtered again to obtain wet flock (average particle size of cellulose dispersion particle at this time was 102 μm). Separately form this, hydrolyzation was performed in the same manner as in Example 6 and acid insoluble residue was obtained and while this residue was dispersed in water, coarse particles are removed by using a screen having a pore size of 75 μm and filtered again to obtain wet flock. This wet flock was dispersed in water and deposited by centrifugal force of 3000 G and the deposited ingredients were filtered to obtain acid insoluble residue (average particle size of cellulose dispersion particle at this time was 22 μm). Unhydrolyzed wet flock and hydrolyzed wet flock in a composition of 50 parts by weight and 50 parts by weight (dry base) were introduced into a 90 L polyethylene bucket, added with pure water so that the concentration of the all solid contents was 39 wt %, neutralized with ammonia water (the pH after neutralization was 7.5-8.0) while stirring with a 3-1 motor, put in a tray and dried at 60° C. for 18 hours, and dried flock was obtained. This dried flock was pulverized in a flush mill and coarse particles were removed by a screen of 500 μm and Cellulose Aggregate H was obtained. Various physical properties of Cellulose Aggregate H are shown in Table 1.

As a result of pore distribution measurement by mercury porosimetry and scanning electron microscope (SEM) observation in the same manner as for Cellulose Aggregate A, a "clear peak" was confirmed in 0.1-10 μm in the pore distribution by mercury porosimetry, and "secondary aggregate structure formed by aggregation of primary particles" was confirmed from SEM picture and boundaries among the primary particles were definite similarly in Cellulose Aggregate A. Disintegration of particles was also observed in the water.

Comparative Example 1

Acid insoluble residue hydrolyzed in the same manner as in Example 6 was dispersed so that the concentration of the solid content might be 17 wt % and cellulose aggregate dried in the same manner as in Example 1 was pulverized with an air stream type pulverizer (manufactured by SEISHIN ENTERPRISE Co., Ltd., trade name, Single Track Jet Mill STJ-200) and Cellulose Powders I were obtained (corresponding to Example 1 of JP-A-63-267731). Various physical properties of the obtained Cellulose Powders I are shown in Table 1.

As a result of scanning electron microscope (SEM) observation of Cellulose Powders I, it was found that they did not have pores within a particle and primary particles were only existing independent and did not take secondary aggregate structure and disintegration of particles was not observed in the water.

Comparative Example 2

Hydrolyzation condition was changed to 3N hydrochloric acid aqueous solution at 40° C. for 40 hours and dispersion was made so that the concentration of the solid content might be 8 wt % and drying was performed in the same manner as in Example 1 and Cellulose Powders J were obtained (corresponding to Example 5 of WO02/02643). Various physical properties of the obtained Cellulose Powders J are shown in Table 1.

Comparative Example 3

Hydrolyzation condition was changed to 3N hydrochloric acid aqueous solution at 40° C. for 20 hours and dispersion was made so that the concentration of the solid content might be 6 wt % and drying was performed in the same manner as in Example 1 and Cellulose Powders K were obtained (corresponding to Example 7 of WO02/02643). Various physical properties of the obtained Cellulose Powders K are shown in Table 1.

Comparative Example 4

Hydrolyzation condition was changed to 4N hydrochloric acid aqueous solution at 40° C. for 48 hours and dispersion was made so that the concentration of the solid content might be 16 wt % and drying was performed in the same manner as in Example 1 and Cellulose Powders L were obtained (corresponding to Example 4 of WO02/02643). Various physical properties of the obtained Cellulose Powders L are shown in Table 1.

Comparative Example 5

Trade name "Avicel" PH-200 available from FMC Corp. was used as it was as Cellulose Powder M. Various physical properties of the obtained Cellulose Powders M are shown in Table 1.

Comparative Example 6

Acid insoluble residue hydrolyzed in the same manner as in Example 6 was dispersed so that the concentration of the solid content might be 17 wt % and cellulose powders dried in the same manner as in Example 1 and official acetaminophen (manufactured by Merck Hoei Ltd.) finely pulverized by a bantam mill (manufactured by Hosokawa Ironworks Co., Ltd.; used screen diameter: 2 mm) were introduced in an amount of 500 g into a high speed agitation granulator (manufactured by Itsutsubashi Seisakujo, trade name, NSK250 type) in a composition of 50 wt % and 50 wt %, and mixed well by turning agitation blades at a rotation rate of 500 rpm for one minute, and subsequently mixed for further two minutes while adding 245-255 g of 50 wt % ethanol aqueous solution as a binder liquid and spherical granules were obtained. The obtained granules were dried at 50° C. for 12 hours and fractions of 12 mesh or more were removed as coarse particles and then acetaminophen was extracted with acetone for 20 hours using Soxhlet extractor. This was dried again at 50° C. for 12 hours and Cellulose Powders N were obtained (corresponding to Example 2 of JP-A-01-272643). Various physical properties of the obtained Cellulose Powders N are shown in Table 1.

Figure 4:
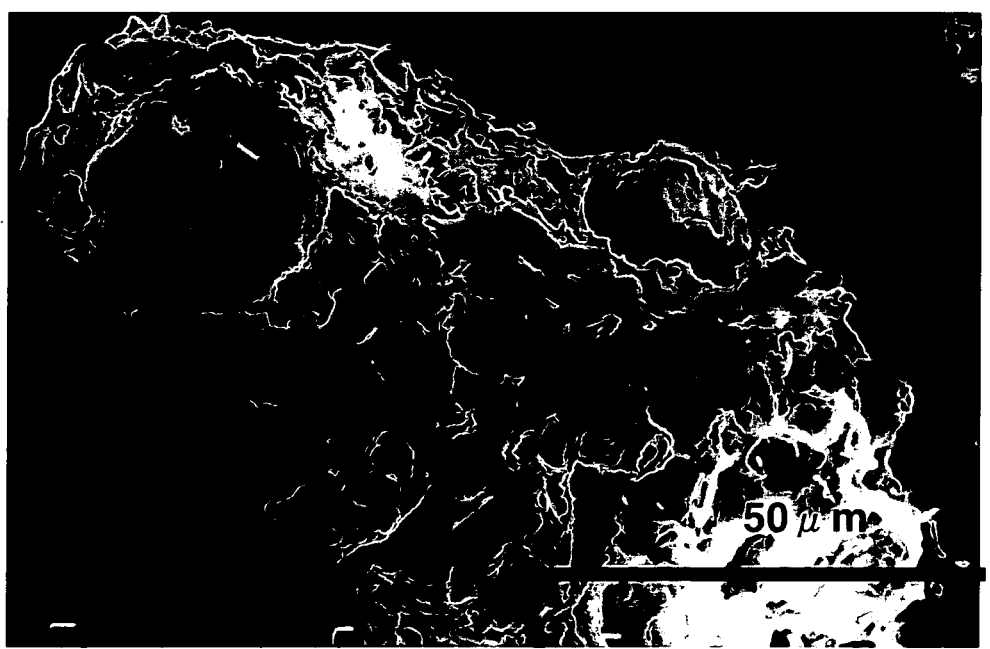
FIG. 4 is an electron microgram of the cellulose particle N (Comparative Example 6) in 250-fold magnification. It can be seen from the photograph that the particle structure of cellulose particle N is not a "secondary aggregate structure formed by aggregation of primary particles" but a "continuous and strong film-like cellulose partition" so that the border of primary particles is inarticulate since the primary cellulose particle is finely divided, and the finely divided particles bond to each other strongly at the time of drying.
Figure 6:
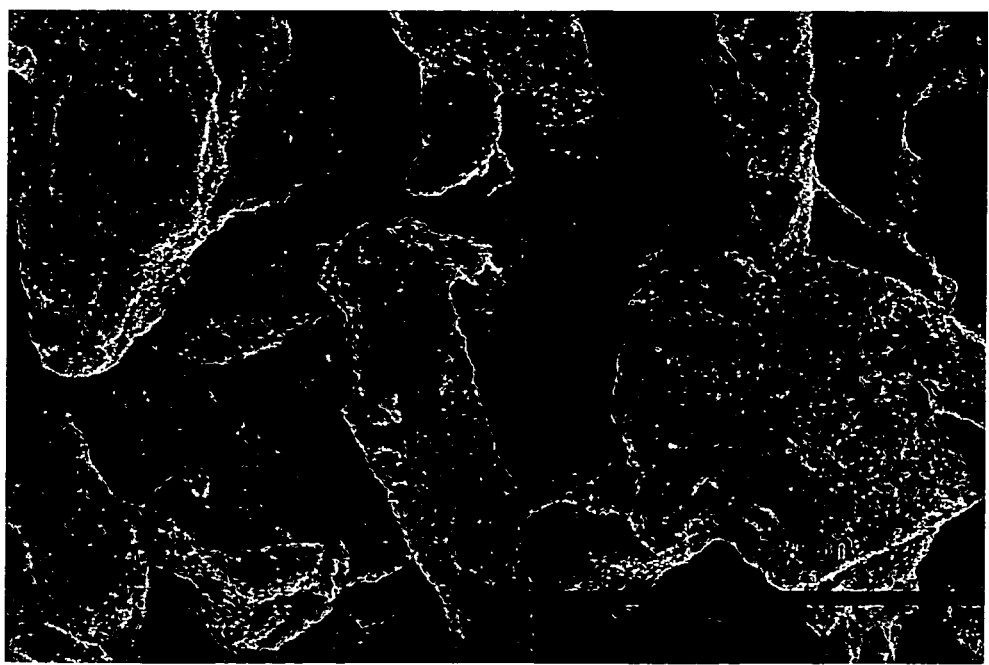
FIG. 6 is an electron microgram of the cellulose particle A (Example 1) in 1500-fold magnification. "The secondary aggregate structure formed by aggregation of primary particles" was confirmed by the photograph, and boundary among primary particles was observed definitely.
Figure 7:
FIG. 7 is an electron microgram of the cellulose particle N (Comparative Example 6) in 1500-fold magnification. It can be seen from the photograph that the partition is in the form of a film and boundary among primary particles is indistinct.
Figure 8:
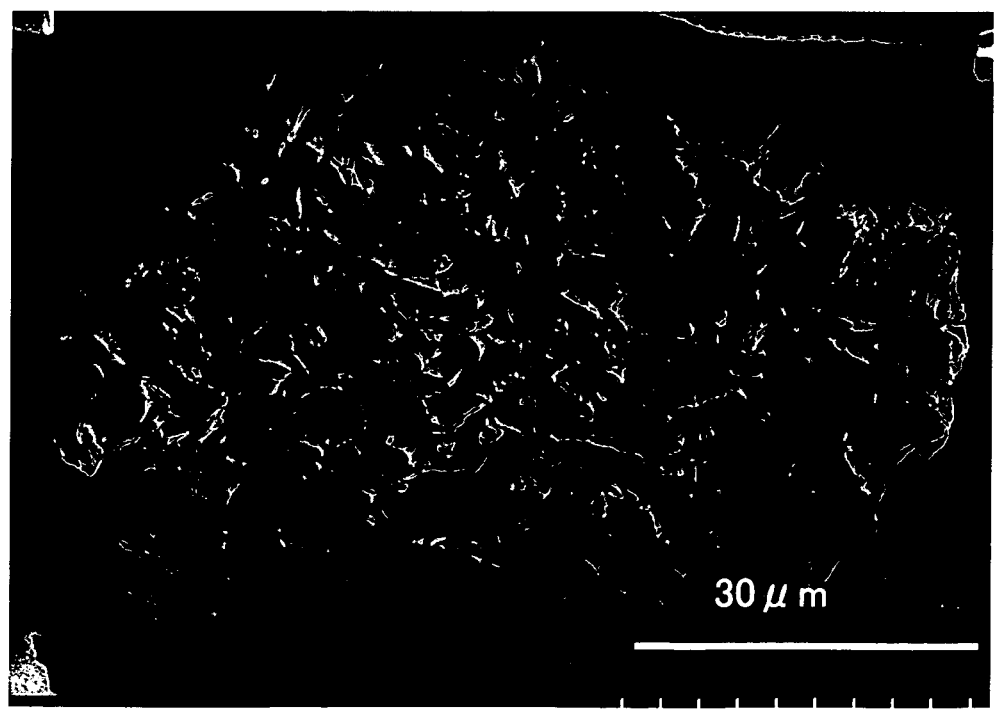
FIG. 8 is a cross-sectional electron microgram of a particle of the porous cellulose aggregate A (Example 1) of the present invention. A state that pores within a particle of a pore diameter corresponding to a "clear peak part" shown by FIG. 1 developed was observed.
Figure 9:
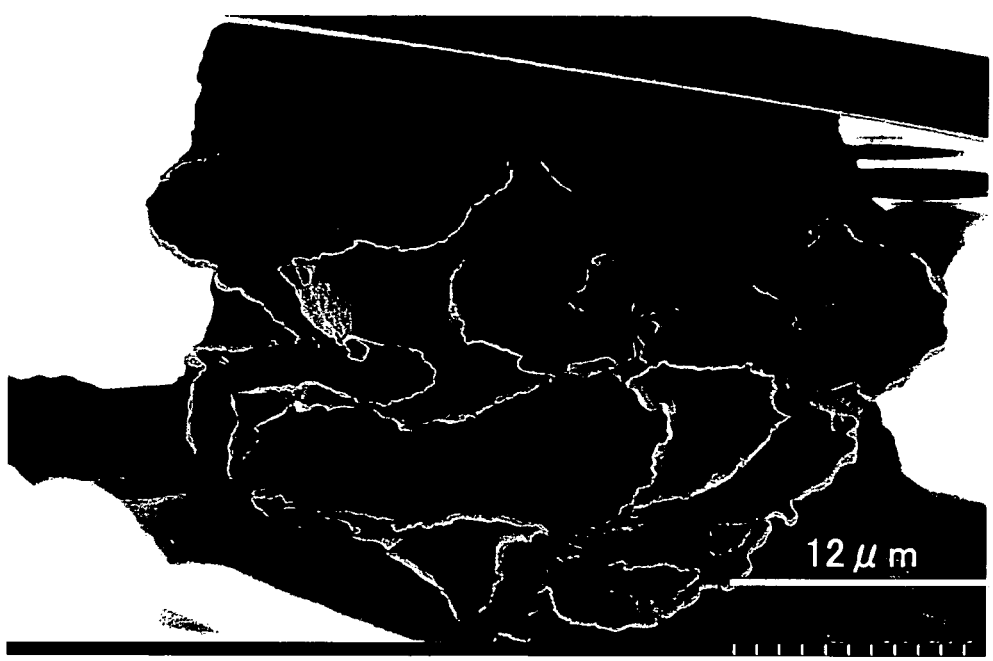
FIG. 9 is a cross-sectional electron microgram of a particle of the cellulose powder P (Comparative Example 8). A closely bonded structure in which cellulose particles bond to each other rigidly is confirmed. Pores within a particle were sparse and not developed, and pore volume by mercury porosimetry was small.
Figure 10:
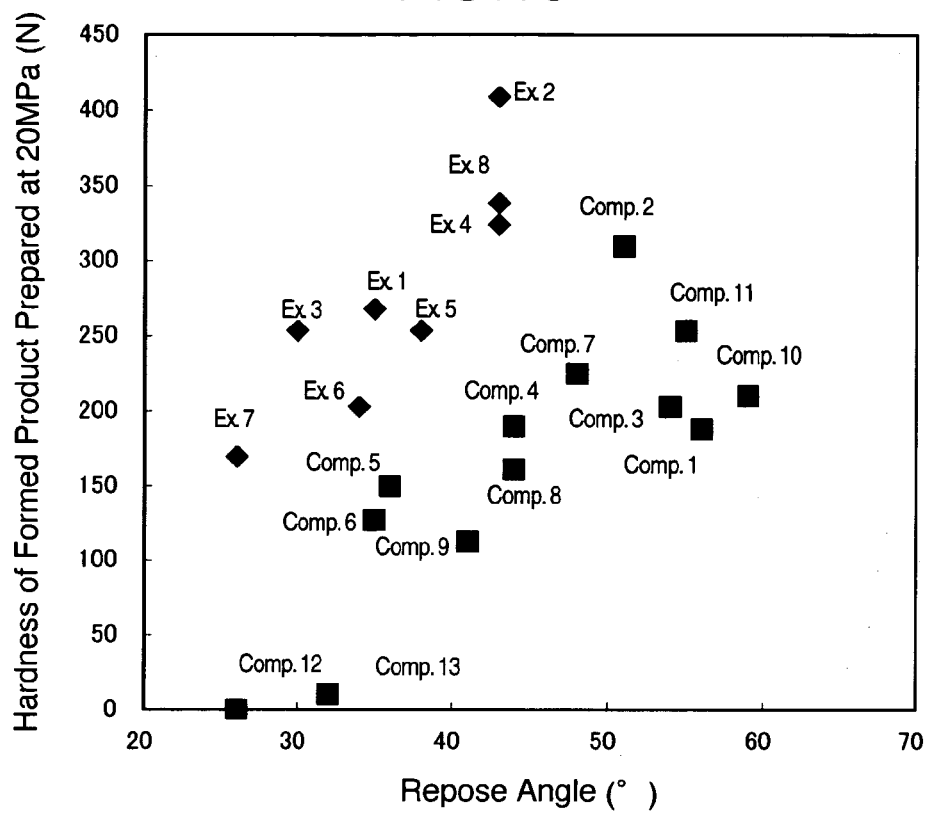
FIG. 10 is a graph showing relations between repose angle and hardness for the cellulose particles A to H in Examples 1 to 8 and cellulose powders or the cellulose particles I to U in Comparative Example 1 to 13 (hardness of columnar molded product prepared by weighing 0.5 g for each and forming columnar molded product of φ 1.1 cm by compression pressure of 20 MPa). As for Examples 1 to 8, the hardness is 165 N or more even if the repose angle is less than 44° and it can be seen that they are excellent in the balance of flowability and compactability. In contrast, as for Comparative Examples 1 to 13, those having hardness of 165 N or more cannot be obtained for the repose angle of less than 44°, and when those having hardness of 165 N or more can be obtained, the repose angle is 44° or more, and therefore, it can be seen that the balance of flowability and compactability is poor. There were no products having a hardness by 20 Mpa of 165 N or more and repose angle of less than 44° and thus being excellent in compactability and flowability as in the present invention in the whole usable range of the apparent specific volume as an excipient, for example, 2.0-6 cm³/g.
Figure 11:
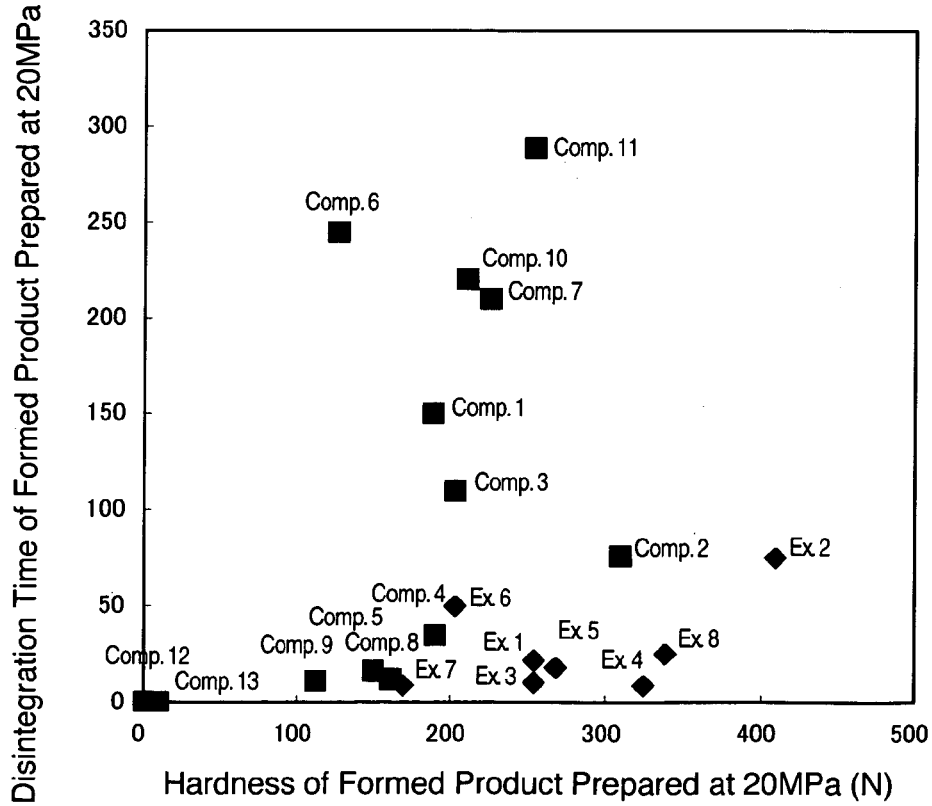
FIG. 11 is a graph showing relations between hardness and disintegration for the cellulose particles A to H in Examples 1 to 8 and cellulose powders or the cellulose particles I to U in Comparative Example 1 to 13 (hardness and disintegration of columnar molded product prepared by weighing 0.5 g for each and forming columnar molded product of φ 1.1 cm by compression pressure of 20 MPa). As for Examples 1 to 8, the disintegration time is 75 seconds or less in the entire region of hardness ranging from 160 N to 400 N and therefore, it can be seen that the balance of hardness and disintegration is excellent. In contrast, as for Comparative Examples 1 to 13, some systems show extreme delay in disintegration when the hardness increases and there were no examples with disintegration time of 75 seconds or less for 160 N or more. There were no products having a hardness by 20 Mpa of 165 N or more and disintegration time of 75 seconds or less and thus being excellent in compactability and disintegration property as an excipient as in the present invention in the whole usable range of the apparent specific volume, for example, 2.0-6.0 cm$^3$/g.

As for Cellulose Powders N, a "clear peak" was confirmed in 0.1-10 μm in the pore distribution as a result of pore distribution measurement according to mercury porosimetry. However, it was confirmed from electron micrograms by SEM (FIGS. 4 and 6) that the particle structure was not a "secondary aggregate structure formed by aggregation of primary particles" but had a "film-like partition structure uniformly and densely continued". In addition, as for the partition, boundaries of primary particles were indistinct. The particles did not disintegrate in the water. Furthermore, columnar molded product made of Cellulose Powders N (compression pressure 10 MPa) was fragile, and the degree of abrasion was high.

Comparative Example 7

Commercial dissolving pulp was cut and hydrolyzed in 7% hydrochloric acid aqueous solution at 105° C. for 20 minutes and the obtained acid insoluble residue was neutralized, washed, filtered and dehydrated to form a wet cake (water content: 50 wt %), and the wet cake was dispersed in isopropanol and filtered, dehydrated and dispersed twice and dispersed three times at processing pressure of 400 kg/cm$^2$ using a Munton-Golin homogenizer (manufactured by Nippon Seiki Seisakusho Co., Ltd. trade name, 15M type) so that concentration of solid contents might be 9.8 wt %, water content 2.5 wt % and isopropanol 87.7 wt %, and spray drying was performed with a nitrogen circulation type spray dryer. Coarse fractions of 250 μm or more were removed from the obtained sample using a JIS standard sieve and Cellulose Powders O (corresponding to Example 2 of JP-A-02-84401) were obtained. Various physical properties of the obtained Cellulose Powders O are shown in Table 1.

As for Cellulose Powders O, a "clear peak" was confirmed in 0.1 μm or less from the result of pore distribution measurement by mercury porosimetry. It was confirmed from electron micrograms by SEM that the particle structure was not a "secondary aggregate structure formed by aggregation of primary particles" but had a "film-like partition structure uniformly and densely continued". In addition, as for the partition, boundaries of primary particles were indistinct. The particles did not disintegrate in the water and aspirin decomposition rate was higher than the pharmacological agent alone.

Comparative Example 8

Acid insoluble residue hydrolyzed in the same manner as in Example 6 was dispersed so that the concentration of the solid content might be 17 wt % and dried in the same manner as in Example 1 to obtain Cellulose Powders P (corresponding to an Example of JP-B-40-26274). Various physical properties of the obtained Cellulose Powders P are shown in Table 1.

Comparative Example 9

2 kg of commercial pulp was finely chipped and hydrolyzed in 0.7 wt % hydrochloric acid aqueous solution at 125° C. for 150 minutes, and the obtained acid insoluble residue was filtered and neutralized, and the obtained wet flock was sufficient ground in a kneader, added with 1-fold by volume ratio of ethanol, pressurized filtered and then air dried. After air dried, broken to flakes by a normal hammer mill and coarse portion was removed with a 40-mesh sieve and Cellulose Powders Q (corresponding to Example 1 of JP-B-53-127553) were obtained. Various physical properties of the obtained Cellulose Powders Q are shown in Table 1.

Comparative Example 10

Commercial dissolving pulp was finely chipped and hydrolyzed in 10 wt % hydrochloric acid aqueous solution at 105° C. for 30 minutes, and the obtained acid insoluble residue was filtered, washed and neutralized, and a dispersion having a concentration of the solid content of 17 wt % was obtained. The obtained cellulose dispersion was dried in a drum dryer (manufactured by Kusuki Kikai Seisakusho Co., Ltd., trade name, KDD-1 type, steam pressure 0.35 MPa, drum temperature 136° C., drum rotating speed 2 rpm, water dispersion maintained at 100° C.), pulverized in a hammer mill and coarse fractions were removed using a screen having a pore size of 425 μm and Cellulose Powders R (corresponding to Example 1 of JP-A-06-316535) were obtained. Various physical properties of the obtained Cellulose Powders R are shown in Table 1.

Comparative Example 11

The Cellulose Powders R obtained in Comparative Example 10 were subjected to an air jet sheave and large particles were removed with a screen of 75 μm and small particles were removed with a screen of 38 μm and thereby Cellulose Powders S (corresponding to an Example of JP-A-11-152233) were obtained. Various physical properties of the obtained Cellulose Powders S are shown in Table 1.

Comparative Example 12

1.5 kg of Cellulose Powders P obtained in Comparative Example 8 was placed in a high-speed agitation granulator (manufactured by Fukae industry Co., Ltd., trade name, FS-10), added with 1.5 kg of distilled water and kneaded for 5 minutes. 1.0 kg of these wet granules was transferred to Marumerizer Q-230, (trade name, product of Fuji Paudal Co., Ltd.) and rolling moved at 500 rpm for 10 minutes to spheroidize the powders. 200 g of distilled water was supplied at speed of 20 g/min at the same time. Then it was left at 40° C. overnight and after dried, screened with a 16-mesh sieve (pore size 1 mm) and spherical core particles T (corresponding to Example 1 of JP-A-07-173050) were obtained. Various physical properties of the obtained spherical core particles T are shown in Table 1.

Cellulose spherical core particles T were extremely dense and excellent in flowability, but they had little specific surface area and pore volume within a particle, and hardly become molded products at a regularly applied compression pressure of 10 or 20 MPa.

Comparative Example 13

Commercial kraft pulp was finely chipped and hydrolyzed in 10 wt % hydrochloric acid aqueous solution at 105° C. for 30 minutes in the same manner as in Example 1, and the obtained acid insoluble residue was filtered, and a cake-like substance of crystalline cellulose in which the concentration of solid contents was 40% (Polymerization degree of this cake-like substance was 153). This cake-like substance was subjected to grinding treatment for one hour with all-purpose mixer stirrer (manufactured by San-Ei Seisakusho, Ltd., trade name, 5DM-03-R type). Water was added to this cake-like substance subjected to grinding treatment and the latter was made into a cellulose dispersion having 12.5 wt % of solid contents with a homomixer (manufactured by Tokushu Kika kogyo Co., Ltd., trade name, T. K. Homomixer MARK II), and the particle size, pH, and IC were adjusted. The cellulose dispersion particle in the cellulose dispersion obtained here was one having a single average particle size, and the average particle size was 7 μm. The dispersion was spray dried using a turning plate with a size of about 8 cm under the conditions of rotating plate rotation frequency 5000 rpm, flow amount 6

L/hr, intake temperature 170° C., discharge temperature 85° C., coarse particles were removed with a screen having a pore size of 177 μm to obtain Cellulose Powders U. Various physical properties of the obtained Cellulose Powders U (corresponding to Example 1 of WO02/36168) are shown in Table 1.

Cellulose Powders U were also dense and excellent in flowability, but they had a small specific surface area and pore volume within a particle, and although they could be a molded product at a regularly applied compression pressure of 10 or 20 MPa but the molded product was fragile and abraded when taken out and could be easily broken with hand.

Examples 9-11, Comparative Examples 14-23

55 parts of acetaminophen (manufactured by API Co., Ltd., powder type), 0.25 part by weight of light silicic anhydride (manufactured by NIPPON AEROSIL CO., LTD., trade name, AEROSIL 200), 27 parts by weight of Cellulose Powders B, E and G obtained in Examples 2, 5 and 7 or Cellulose Powders I, J and L to S obtained in Comparative Examples 1, 2 and 4 to 11, 2 parts by weight of crospovidone (manufactured by BASF, trade name, Kollidon CL) and 15 parts of granulated lactose (manufactured by Lactose New Zealand, trade name, Super-Tab) were put into a 100 L scale V-type mixer (manufactured by Dalton Corp.) and mixed for 30 minutes and subsequently added with 0.5 part by weight of magnesium stearate (manufactured by Taihei Chemical Industrial, Co., Ltd., vegetable origin), mixed further for 5 minutes and a formulated powder was obtained. Here the total amount of each powder was 25 kg. The obtained formulated powder was supplied to a rotary tablet machine (Kikusui Seisakusho, Ltd., trade name, LIBRA-II, rotating plate diameter φ 410 mm for 36 mallets). Punched with mallets having a diameter of 8 mm, 12R, under the turning table rotation of 50 rpm, compressive force 7.5 kN, 200 mg in weight of tablets were obtained. Tablets were sampled in 60 minutes after the tableting started and weight, hardness and abrasion degree of the tablets and incidence of troubles in tableting were measured. Various physical properties of the obtained tablets are shown in Table 2.

Example 12

5 g of Cellulose Aggregate A was put into 20 g of a solution type active ingredient which was prepared by diluting an Ibuprofen-polyethylene glycol solution (quantitative ratio 1:5) with ethanol (manufactured by Wako Pure Chemical Industries, Ltd., special grade) by 10 fold and mixed with a magnetic stirrer in a beaker for 5 minutes. The mixed solution was suction dried with an evaporator to obtain a powder. 0.2 g of the obtained powder was weighed, put in a mortar (manufactured by Kikusui Seisakusho, Ltd. using materials SUS2, 3) and compressed with a round plane mallet (manufactured by Kikusui Seisakusho, Ltd. using materials SUS2, 3) of a diameter of 0.8 cm till the pressure reached 100 MPa (manufactured by Aikoh Engineering, trade name, PCM-1A, compression rate 1 cm/min) and after held at the aimed pressure for 10 seconds, a columnar molded product was taken out. When the surface of the molded product shaped by compression was observed, oozing of a liquid ingredient was not observed. In addition, a sieve of pore size 1000 μm was put in a beaker containing 100 mL of pure water and agitated with a stirrer so that the sieve covers the stirrer and the molded product was cast on the sieve and was observed after it was left untouched for 1 minute. The results are shown in Table 3.

Comparative Example 24

Similarly operating as in Example 12 except that Cellulose Aggregate A was changed to Cellulose Powder N (corresponding to Example 2 of JP-A-01-272643), a molded product containing a liquid ingredient was produced and tests on oozing of the liquid ingredient and disintegration were carried out. The results are shown in Table 3.

Comparative Example 25

Similarly operating as in Example 12 except that Cellulose Aggregate A was changed to Cellulose Powder O (corresponding to Example 2 of JP-A-02-84401), a molded product containing a liquid ingredient was produced and tests on oozing of the liquid ingredient and disintegration were carried out. The results are shown in Table 3.

Comparative Example 26

Similarly operating as in Example 12 except that Cellulose Aggregate A was changed to Cellulose Powder P (corresponding to an Example of JP-B-40-26274), a molded product containing a liquid ingredient was produced and tests on oozing of the liquid ingredient and disintegration were carried out. The results are shown in Table 3.

Comparative Example 27

Similarly operating as in Example 12 except that Cellulose Aggregate A was changed to Cellulose Powder Q (corresponding to Example 1 of JP-B-53-127553), a molded product containing a liquid ingredient was produced and tests on oozing of the liquid ingredient and disintegration were carried out. The results are shown in Table 3.

Comparative Example 28

Similarly operating as in Example 12 except that Cellulose Aggregate A was changed to Cellulose Powder J (corresponding to Example 5 of WO02/02643), a molded product containing a liquid ingredient was produced and tests on oozing of the liquid ingredient and disintegration were carried out. The results are shown in Table 3.

Example 13

30 g of acetaminophen (a powder type product by API Co., Ltd. which was pulverized three times by a small pulverizer with pore size of 0.12 μm and used; average particle size of the obtained acetaminophen was 8 μm), 15 g of talc (manufactured by Wako Pure Chemical Industries, Ltd.) were put into a polyethylene bag, which was shaken by hand for three minutes, and after that, in addition to 25.3 g of mixed powder, 675.6 g of Cellulose Aggregate A and 988.1 g of 100 mesh lactose (manufactured by DMV Corp.)(mixing ratio: cellulose/lactose/acetaminophen/talc=40/58.5/1/0.5) were weighed and put in a V-type mixer (manufactured by Dalton company) of a capacity of 5 liter (volume filling factor set to about 65%) and mixed for 30 minutes. Drug level variation index was shown in Table 4.

15 g of magnesium stearate was added to the formulated powder mixed for 30 minutes, and they were further mixed similarly for 5 minutes, and 0.5 g of the obtained powder was weighed and put in a mortar (manufactured by Kikusui Seisakusho, Ltd. using materials SUS2, 3) and compressed with a round plane mallet (manufactured by Kikusui Seisakusho, Ltd. using materials SUS2, 3) of a diameter of 1.0 cm till the pressure reached 100 MPa (manufactured by Aikoh Engineering, trade name, PCM-1A, compression rate 1 cm/min) and after held at the aimed pressure for 10 seconds, a columnar molded product was taken out. As for breaking strength of the molded product, load was applied to columnar molded products or tablets using a Schleuniger hardness gauge (manufactured by Freund Industrial, Co., Ltd., trade name, 6D type) in the diameter direction of the columnar molded products or tablets and destroyed and the load at that time was measured. Represented by the average of 10 samples. In addition, a sieve of pore size 1000 μm was put in a beaker containing 100 mL of pure water and agitated with a stirrer so that the sieve covers the stirrer and the molded product was cast on the sieve and was observed after it was left untouched for 1 minute. The results are shown in Table 4.

Although the particle size was half the particle size of the finely pulverized acetaminophen used in JP-A-2003-81876, the drug level variation index upon mixing is lowered to 1.0% or less after 30 minutes by using the porous cellulose aggregate of the present invention, and extremely good mixing homogeneity can be achieved.

Comparative Example 29

Similarly operating as in Example 13 except that Cellulose Aggregate A was changed to Cellulose Powder N (corresponding to Example 2 of JP-A-01-272643), drug level variation index after mixed for 30 minutes, breaking strength and disintegration time of the molded product were determined. The results are shown in Table 4.

Comparative Example 30

Similarly operating as in Example 13 except that Cellulose Aggregate A was changed to Cellulose Powder O (corresponding to Example 2 of JP-A-02-84401), drug level variation index after mixed for 30 minutes, breaking strength and disintegration time of the molded product were determined. The results are shown in Table 4.

Comparative Example 31

Similarly operating as in Example 13 except that Cellulose Aggregate A was changed to Cellulose Powder P (corresponding to an Example of JP-B-40-26274 and corresponding to trade name crystalline cellulose "Avicel" PH-101), drug level variation index after mixed for 30 minutes, breaking strength and disintegration time of the molded product were determined. The results are shown in Table 4. By reducing the average particle size of the finely pulverized acetaminophen, which is active ingredient, used in JP-A-2003-81876 to half in the same formulation as in Example 3 of JP-A-2003-81876, adhesion aggregation characteristics of the active ingredient increased markedly and mixing homogeneity became worse than that disclosed in Example 3 of this patent publication.

Comparative Example 32

Similarly operating as in Example 13 except that Cellulose Aggregate A was changed to Cellulose Powder Q (corresponding to Example 1 of JP-B-53-127553 and corresponding to trade name crystalline cellulose "Avicel" PH-301), drug level variation index after mixed for 30 minutes, breaking strength and disintegration time of the molded product were determined. The results are shown in Table 4.

Comparative Example 33

Similarly operating as in Example 13 except that Cellulose Aggregate A was changed to Cellulose Powder J (corresponding to Example 5 of WO02/02643 and corresponding to trade name crystalline cellulose "Ceolus" KG-802), drug level variation index after mixed for 30 minutes, breaking strength and disintegration time of the molded product were determined. The results are shown in Table 4.

Example 14

Cellulose Aggregate A was used, and commercial ibuprofen (an active ingredient which is described in 14th revision of Japanese Pharmacopeia as almost insoluble in water) was dissolved in polyethylene glycol (manufactured by Sanyo Kasei Co., Ltd. macrogol 400) in a ratio of 1:5 and the liquid further diluted 10 times with ethanol was added to Cellulose Particles A so that it might be 10 wt % and stirred in a mortar. 0.2 g of the obtained mixed powder was weighed and put in a mortar (manufactured by Kikusui Seisakusho, Ltd. using materials SUS2, 3) and compressed with a round plane mallet (manufactured by Kikusui Seisakusho, Ltd. using materials SUS2, 3) of a diameter of 0.8 cm till the pressure reached 100 MPa (manufactured by Aikoh Engineering, trade name, PCM-1A, compression rate 1 cm/min) and after held at the aimed pressure for 10 seconds, a columnar molded product was taken out. As for the observation of oozing of a liquid ingredient on the surface of the obtained molded product, dissolution of a pharmacological agent from the columnar molded product (a elution test apparatus (manufactured by JASCO Corp., rotary rate of the paddle: 100 rpm, Pharmacopeia I liquid, 900 mL) was used and dissolution rate was calculated from absorbance of the liquid after three minutes by an ultraviolet absorbance measuring instrument) and disintegration time of the columnar molded product were measured. The results are shown in Table 5. It was confirmed that oozing of polyethylene glycol from the columnar molded product did not occur, disintegration property was good, and dissolution rate of the pharmacological agent after three minutes was high with quick solubility.

Comparative Example 34

Similarly operating as in Example 14 except that Cellulose Aggregate A was changed to Cellulose Powder N (corresponding to Example 2 of JP-A-01-272643), preparation of a molded product, observation of oozing of a liquid ingredient on the surface of the molded product, measurement of dissolution rate of a pharmacological agent from the columnar molded product and observation of disintegration property were performed. The results are shown in Table 5. Although oozing of a liquid ingredient from the columnar molded product was not observed, it floated on the surface of the liquid for 3 minutes without disintegration in the elution test and the disintegration property was poor.

Comparative Example 35

Similarly operating as in Example 14 except that Cellulose Aggregate A was changed to Cellulose Powder O (corresponding to Example 2 of JP-A-02-84401), preparation of a molded product, observation of oozing of a liquid ingredient on the surface of the molded product, measurement of dissolution rate of a pharmacological agent from the columnar molded product and observation of disintegration property were performed. The results are shown in Table 5. Although oozing of a liquid ingredient from the columnar molded product was not observed, it floated on the surface of the liquid for 3 minutes without disintegration in the elution test and the disintegration property was poor.

Comparative Example 36

Similarly operating as in Example 14 except that Cellulose Aggregate A was changed to Cellulose Powder P (corresponding to an Example of JP-B-40-26274), preparation of a molded product, observation of oozing of a liquid ingredient on the surface of the molded product, measurement of dissolution rate of a pharmacological agent from the columnar molded product and observation of disintegration property were performed. The results are shown in Table 5. Oozing of a liquid ingredient on the surface of the columnar molded product was observed, it could not be a tablet and elution test could not be performed.

Comparative Example 37

Similarly operating as in Example 14 except that Cellulose Aggregate A was changed to Cellulose Powder Q (corresponding to Example 1 of JP-B-53-127553), preparation of a molded product, observation of oozing of a liquid ingredient on the surface of the molded product, measurement of dissolution rate of a pharmacological agent from the columnar molded product and observation of disintegration property were performed. The results are shown in Table 5. Oozing of a liquid ingredient on the surface of the columnar molded product was observed, it could not be a tablet and elution test could not be performed.

Comparative Example 38

Similarly operating as in Example 14 except that Cellulose Aggregate A was changed to Cellulose Powder J (corresponding to Example 5 of WO02/02643), preparation of a molded product, observation of oozing of a liquid ingredient on the surface of the molded product, measurement of dissolution rate of a pharmacological agent from the columnar molded product and observation of disintegration property were performed. The results are shown in Table 5. Oozing of a liquid ingredient on the surface of the columnar molded product was observed, it could not be a tablet and elution test could not be performed.

Example 15

1 g of Cellulose Aggregate G was added to 10 mL of a solution in which ethenzamide (manufactured by API Co., Ltd., a powder grade was pulverized with a small size pulverizer) was dissolved in ethanol (manufactured by Wako Pure Chemical Industries, Ltd., special grade chemical) in a ratio of 5:95 and stirred by a magnetic stirrer for three minutes. The obtained dispersion was introduced into an evaporator and completely deprived of solvent to obtain a powder sample.

Similarly operating as in Example 14 except that the pressure at the time of preparing a columnar molded product from this powder was changed to 50 MPa and elution test was performed. The results are shown in Table 6.

Comparative Example 39

Only the ethenzamide pulverized by the method of Example 15 was subjected to elution test. The results are shown in Table 6.

Example 16

Cellulose Aggregate A was used, and commercial ibuprofen (an active ingredient which is described in 14th revision of Japanese Pharmacopeia as almost insoluble in water) was dissolved in ethanol (manufactured by Wako Pure Chemical Industries, Ltd., special grade chemical) in a ratio of 1:5 and the liquid was added to Cellulose Aggregate A so that it might be 10 wt % and stirred in a mortar. Ethanol was completely removed from the obtained wet mixed powder using an evaporator and dry powder was obtained. 0.2 g of the obtained dry powder was weighed and put in a mortar (manufactured by Kikusui Seisakusho, Ltd. using materials SUS2, 3) and compressed with a round plane mallet (manufactured by Kikusui Seisakusho, Ltd. using materials SUS2, 3) of a diameter of 0.8 cm till the pressure reached 100 MPa (manufactured by Aikoh Engineering, trade name, PCM-1A, compression rate 1 cm/min) and after held at the aimed pressure for 10 seconds, a columnar molded product was taken out. 100 pieces of the obtained columnar molded product were put in a bottle and stored in a closely stoppered system at 40° C. for two weeks and cloudiness of the bottle was observed. The elution test of an active ingredient from the obtained columnar molded product (a elution test was performed under the condition of a product of JASCO Corp., rotary rate of the paddle: 100 rpm, Pharmacopeia I liquid, 900 mL to measure the absorbance of the liquid after one minute by an ultraviolet absorbance measuring instrument and calculate the elution rate of three minutes after the start of the test) and disintegration property of the molded product were observed. The results are shown in Table 7.

Comparative Example 40

Similarly operating as in Example 16 except that Cellulose Aggregate A was changed to Cellulose Powder N (corresponding to Example 2 of JP-A-02-84401), preparation of a columnar molded product, observation of cloudiness of the bottle after closely stoppered storage, elution test and observation of disintegration property were performed. The results are shown in Table 7. Although cloudiness of the bottle was not observed, the tablet did not disintegrate in a minute and floated on the surface of the liquid.

Comparative Example 41

Similarly operating as in Example 16 except that Cellulose Aggregate A was changed to Cellulose Powder O (corresponding to Example 2 of JP-A-02-84401), preparation of a columnar molded product, observation of cloudiness of the bottle after closely stoppered storage, elution test and observation of disintegration property were performed. The results are shown in Table 7. Although cloudiness of the bottle was not observed, the tablet did not disintegrate in a minute and floated on the surface of the liquid.

Comparative Example 42

Similarly operating as in Example 16 except that Cellulose Aggregate A was changed to Cellulose Powder P (corresponding to an Example of JP-B-40-26274), preparation of a columnar molded product, observation of cloudiness of the bottle after closely stoppered storage, elution test and observation of disintegration property were performed. The results are shown in Table 7. Because sublimated ibuprofen recrystallized on the bottle wall, cloudiness of the bottle was observed.

TABLE 1

| | | Cellulose Powder | Crystal Form | Physical Properties of Powders | | | | |
|---|---|---|---|---|---|---|---|---|
| | | | | Specific Surface Area ($m^2/g$) | Drug Reactivity | Central Pore Size (μm) | Pore within Particle ($cm^3/g$) | Particle Structure by SEM (secondary aggregate) |
| Example | 1 | A | I | 2.3 | None | 0.1 or more | 0.55 | ○ |
| | 2 | B | I | 12.5 | None | 0.1 or more | 0.82 | ○ |
| | 3 | C | I | 2.5 | None | 0.1 or more | 0.602 | ○ |
| | 4 | D | I | 3.0 | None | 0.1 or more | 0.67 | ○ |
| | 5 | E | I | 3.5 | None | 0.1 or more | 0.65 | ○ |
| | 6 | F | I | 3.5 | None | 0.1 or more | 0.48 | ○ |
| | 7 | G | I | 2.2 | None | 0.1 or more | 0.265 | ○ |
| | 8 | H | I | 1.8 | None | 0.1 or more | 0.625 | ○ |
| Comparative Example | 1 | I | I | 1.4 | None | Indefinite | 0.264 | X |
| | 2 | J | I | 1.5 | None | Indefinite | 0.245 | ○ |
| | 3 | K | I | 1.7 | None | Indefinite | 0.24 | ○ |
| | 4 | L | I | 1.0 | None | Indefinite | 0.245 | ○ |
| | 5 | M | I | 1.1 | None | Indefinite | 0.203 | ○ |
| | 6 | N | I | 5.0 | None | 0.1 or more | 0.5067 | X |
| | 7 | O | I | 24.1 | Observed | Less than 0.1 | 0.89 | Central Pore Size less than 0.1 μm |
| | 8 | P | I | 1.0 | None | Indefinite | 0.258 | ○ |
| | 9 | Q | I | 0.6 | None | Indefinite | 0.23 | ○ |
| | 10 | R | I | 1.9 | None | Indefinite | 0.24 | ○ |
| | 11 | S | I | 2.4 | None | Indefinite | 0.235 | ○ |
| | 12 | T | I | 0.1 | None | Indefinite | 0.048 | X |
| | 13 | U | I | 0.3 | None | Indefinite | 0.098 | X |

| | | Physical Properties of Powders | | | | Physical Properties of Columnar Molded Product | | |
|---|---|---|---|---|---|---|---|---|
| | | Disintegration in water | Average Particle size (μm) | Apparent Specific Volume ($cm^3/g$) | Repose Angle (°) | 10 MPa Hardness (N) | 20 MPa Hardness (N) | 20 MPa Disintegration (sec) |
| Example | 1 | Disintegrated | 70 | 4 | 35 | 95 | 268 | 18 |
| | 2 | Disintegrated | 31 | 4 | 43 | 145 | 409 | 75 |
| | 3 | Disintegrated | 90 | 3 | 30 | 90 | 254 | 10 |
| | 4 | Disintegrated | 60 | 4 | 43 | 115 | 324 | 9 |
| | 5 | Disintegrated | 248 | 5 | 38 | 90 | 254 | 22 |
| | 6 | Disintegrated | 120 | 3 | 34 | 72 | 203 | 50 |
| | 7 | Disintegrated | 190 | 2 | 26 | 60 | 169 | 9 |
| | 8 | Disintegrated | 220 | 6 | 43 | 120 | 338 | 25 |
| Comparative Example | 1 | Not Disintegrated | 28 | 5 | 55 | 90 | 254 | 289 |
| | 2 | Disintegrated | 45 | 5 | 51 | 110 | 309 | 76 |
| | 3 | Disintegrated | 38 | 6 | 54 | 72 | 203 | 110 |
| | 4 | Disintegrated | 105 | 4 | 44 | 66 | 190 | 35 |
| | 5 | Disintegrated | 203 | 3 | 36 | 52 | 150 | 16 |
| | 6 | Not Disintegrated | 174 | 2 | 35 | 45 | 127 | 245 |
| | 7 | Not Disintegrated | 48 | 5 | 48 | 80 | 225 | 210 |
| | 8 | Disintegrated | 49 | 3 | 44 | 57 | 161 | 12 |
| | 9 | Disintegrated | 35 | 2 | 41 | 40 | 113 | 11 |
| | 10 | Disintegrated | 47 | 5 | 56 | 101 | 188 | 150 |
| | 11 | Disintegrated | 50 | 6 | 59 | 106 | 210 | 220 |
| | 12 | Not Disintegrated | 220 | 1 | 26 | 0 | 0 | — |
| | 13 | Not Disintegrated | 93 | 1 | 32 | 5 | 10 | — |

TABLE 2

|  |  | Cellulose Powder | Variation in Tablet Weight (%) | Physical Properties of Tablets Obtained By Quick Tableting | | |
|---|---|---|---|---|---|---|
|  |  |  |  | Hardness of Tablet (N) | Abrasion of Tablet (%) | Incident of Troubles in Tableting (%) |
| Example | 9 | B | 0.8 | 75 | 0.3 | 0 |
|  | 10 | E | 0.9 | 66 | 0.1 | 0 |
|  | 11 | G | 0.4 | 51 | 0.9 | 0 |
| Comparative | 14 | I | 2.3 | 65 | 0.6 | 0 |
| Example | 15 | J | 1.8 | 67 | 0.6 | 0 |
|  | 16 | L | 1.1 | 42 | 6.0 | 30 |
|  | 17 | M | 0.6 | 38 | 15.0 | 88 |
|  | 18 | N | 0.7 | 32 | 12.0 | 48 |
|  | 19 | O | 1.5 | 48 | 5.0 | 15 |
|  | 20 | P | 1.1 | 35 | 19.0 | 72 |
|  | 21 | Q | 0.8 | 30 | 22.7 | 90 |
|  | 22 | R | 2.4 | 55 | 0.9 | 0 |
|  | 23 | L | 2.3 | 57 | 0.8 | 0 |

TABLE 3-1

| | Physical Properties of Cellulose Particle | | | | |
|---|---|---|---|---|---|
| | Cellulose Particle | Secondary Aggregate Structure | Pore Volume within Particle (cm³/g) | Crystal Form | Average Particle size (μm) |
| Example 12 | A | ○ | 0.550 | Type I | 70 |
| Comparative Example 24 | N | X | 0.507 | Type I | 174 |
| Comparative Example 25 | O | X | 0.890 | Type I | 48 |
| Comparative Example 26 | P | ○ | 0.258 | Type I | 49 |
| Comparative Example 27 | Q | ○ | 0.230 | Type I | 35 |
| Comparative Example 28 | J | ○ | 0.245 | Type I | 45 |

| | Physical Properties of Cellulose Particle | | | |
|---|---|---|---|---|
| | Specific Surface Area (m²/g) | Apparent Specific Volume (cm³/g) | Repose Angle (°) | Particle Disintegration property |
| Example 12 | 2.3 | 4.0 | 35 | Disintegrated |
| Comparative Example 24 | 5.0 | 2.1 | 35 | Not Disintegrated |
| Comparative Example 25 | 24.1 | 4.5 | 48 | Not Disintegrated |
| Comparative Example 26 | 1.0 | 3.2 | 44 | Disintegrated |
| Comparative Example 27 | 0.6 | 2.0 | 41 | Disintegrated |
| Comparative Example 28 | 1.5 | 5.3 | 51 | Disintegrated |

| | Physical Properties of Compressed Molded Product | | |
|---|---|---|---|
| | Cellulose Particle | Oozing of Liquid Ingredient | Disintegration property |
| Example 12 | A | No Oozing | Disintegrated |
| Comparative Example 24 | N | No Oozing | Not Disintegrated |
| Comparative Example 25 | O | No Oozing | Not Disintegrated |
| Comparative Example 26 | P | Oozing | Disintegrated |
| Comparative Example 27 | Q | Oozing | Disintegrated |
| Comparative Example 28 | J | Oozing | Disintegrated |

TABLE 4

| | Cellulose Particle | Variation Index of Drug Concentration (%) | | | Physical Properties of Compressed Molded Product | |
|---|---|---|---|---|---|---|
| | | After 5 min | After 15 min | After 30 min | Breaking Strength (N) | Disintegration Time |
| Example 13 | A | 1.6 | 0.9 | 0.9 | 60 | Several seconds |
| Comparative Example 29 | N | 1.8 | 1.5 | 2.4 | 28 | Several tens seconds |
| Comparative Example 30 | O | 6.8 | 1.9 | 3.4 | 24 | Several tens seconds |
| Comparative Example 31 | P | 7.5 | 6.8 | 2.5 | 36 | Several seconds |
| Comparative Example 32 | Q | 5.8 | 3.2 | 3.5 | 25 | Several seconds |
| Comparative Example 33 | J | 15.2 | 10.6 | 4.5 | 63 | Several seconds |

TABLE 5

| | Cellulose | Physical Properties of Compressed Molded Product | | |
|---|---|---|---|---|
| | | Condition of Molded product | Disintegration State | Dissolution Rate after 3 min (%) |
| Example 14 | A | No Oozing, Solidified | Disintegrated | 95 |
| Comparative Example 34 | N | No Oozing, Solidified | Not Disintegrated | 35 |
| Comparative Example 35 | O | No Oozing, Solidified | Not Disintegrated | 38 |
| Comparative Example 36 | P | Oozing, Not Solidified | Not Tested | Not Testable |
| Comparative Example 37 | Q | Oozing, Not Solidified | Not Tested | Not Testable |
| Comparative Example 38 | J | Oozing, Not Solidified | Not Tested | Not Testable |

TABLE 6

| | Cellulose | Physical Properties of Compressed Molded Product |
|---|---|---|
| | | Dissolution Rate after 1 hour (%) |
| Example 15 | G | 95 |
| Comparative Example 39 | Bulk Ethenzamide | 9 |

TABLE 7

| | Cellulose Particle | Physical Properties of Compressed Molded Product | | |
|---|---|---|---|---|
| | | Clouding on Inner Bottle Wall | Disintegration property | Dissolution Rate (%) |
| Example 16 | A | None | Disintegrated | 90 |
| Comparative Example 40 | N | None | Not Disintegrated | 32 |
| Comparative Example 41 | O | None | Not Disintegrated | 30 |
| Comparative Example 42 | P | Observed | Disintegrated | 18 |

INDUSTRIAL APPLICABILITY

The highly flowable porous cellulose aggregate excellent in compactability and disintegration property of the present invention, and a molded product composition containing the cellulose particle and one or more active ingredients relate to a highly flowable porous cellulose aggregate and a molded product composition containing the cellulose particle and one or more active ingredients in which crystal form is type I, and a porous structure formed by aggregation of primary particles is provided, specific surface area is in a specific range, pore volume within a particle is large, and the particles quickly disintegrate in water and the repose angle is small, and mainly usable in the field of pharmaceutical products.

The invention claimed is:

1. A porous cellulose aggregate having a secondary aggregate structure formed by aggregation of primary cellulose particles consisting of cellulose dispersion particle groups (A) and (B), wherein
   the cellulose dispersion particle group (A) has an average particle size of 10-110 μm and a shape with a ratio (L/D) of 2.0 or more, where
      L is an average length of a major diameter of the cellulose particles and
      D is an average length of a minor diameter of the cellulose particles,
   the cellulose dispersion particle group (B) has an average particle size of 0.01-0.7 times the average particle size of the cellulose dispersion particle group (A), and
   a weight ratio of (A):(B) is from about 5:95 to about 95:5, the aggregate having a pore volume within a particle of 0.265 cm$^3$/g to 2.625 cm$^3$/g, containing type I crystals, and having an average particle size of more than 30 μm and 250 μm or less, a specific surface area of 1.3-12.5 m²/g, a repose angle of 25° or more and less than 44° and properties to disintegrate in water.

2. The porous cellulose aggregate according to claim 1, wherein the repose angle is 25° to 42°.

3. The porous cellulose aggregate according to claim 1, wherein a breaking load of a tablet obtained by compressing 0.5 g of the porous cellulose aggregate at 20 MPa is 165 to 410 N.

4. The porous cellulose aggregate according to claim 3, wherein the breaking load is 200 to 410 N and a disintegration time is 75 seconds or less.

5. A process for producing the porous cellulose aggregate according to claim 1, comprising drying a dispersion containing a liquid medium and the cellulose dispersion particle groups (A) and (B).

6. A molded product composition comprising one or more active ingredients and the porous cellulose aggregate according to claim 1.

7. The molded product composition according to claim 6 wherein the one active ingredient is a poorly water-soluble active ingredient.

8. The molded product composition according to claim 6 wherein the one active ingredient is a sublimable active ingredient.

9. A molded product composition comprising one or more active ingredients liquid or semisolid at room temperature and the porous cellulose aggregate according to claim 1.

10. A molded product composition comprising one or more active ingredients finely pulverized to a particle size of 40 μm or less and the porous cellulose aggregate according to claim 1.

11. A molded product composition comprising one or more active ingredients finely pulverized to a particle size of 10 μm or less and the porous cellulose aggregate according to claim 1.

12. A process for producing the porous cellulose aggregate according to claim 1, comprising drying a dispersion containing an aqueous liquid medium and the cellulose dispersion particle groups (A) and (B).

13. The porous cellulose aggregate of claim 1, wherein the porous cellulose aggregate is obtained by drying the cellulose dispersion particle groups having water as a medium.

* * * * *